United States Patent
Homchaudhuri et al.

(10) Patent No.: US 11,936,473 B2
(45) Date of Patent: Mar. 19, 2024

(54) STATION PERFORMANCE ENHANCEMENT WITH MULTI-LINK OPERATIONS (MLO)

(71) Applicant: QUALCOMM Incorporated, San Diego, CA (US)

(72) Inventors: Sandip Homchaudhuri, San Jose, CA (US); Srinivas Katar, Fremont, CA (US); Chao Zou, San Jose, CA (US); Alireza Raissinia, Monte Sereno, CA (US); Lei Li, Milpitas, CA (US); Deepak Nagawade, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/233,341

(22) Filed: Apr. 16, 2021

(65) Prior Publication Data

US 2022/0337338 A1 Oct. 20, 2022

(51) Int. Cl.
*H04L 1/00* (2006.01)
*H04W 28/02* (2009.01)
*H04W 28/08* (2023.01)

(52) U.S. Cl.
CPC ....... *H04L 1/0018* (2013.01); *H04W 28/0284* (2013.01); *H04W 28/0958* (2020.05)

(58) Field of Classification Search
None
See application file for complete search history.

(56) References Cited

U.S. PATENT DOCUMENTS

| | | | |
|---|---|---|---|
| 2005/0002421 A1* | 1/2005 | Ito | H04L 1/1809 370/428 |
| 2011/0080868 A1 | 4/2011 | Krishnaswamy et al. | |
| 2015/0030091 A1 | 1/2015 | El-Najjar et al. | |

(Continued)

FOREIGN PATENT DOCUMENTS

EP 2861015 A1 4/2015

OTHER PUBLICATIONS

3GPP TS 25.214, "3rd Generation Partnership Project; Technical Specification Group Radio Access Network; Physical Layer Procedures (FDD), (Release 16)", 3GPP TS 25.214, V16.0.0, Jul. 2020, pp. 1-140.

(Continued)

*Primary Examiner* — Alex Skripnikov
(74) *Attorney, Agent, or Firm* — Holland & Hart LLP

(57) ABSTRACT

This disclosure provides systems, methods, apparatus, including computer programs encoded on computer storage media that support station performance enhancement with multi-link operations. An example method may include determining at least one network metric related to at least one link between a station (STA) and access points (APs) and determining at least one connection parameter related to at least one application operating on the STA. The method may include selecting a mode of multi-link operations based at least in part on the network metric and the connection parameter, wherein the mode of multi-link operations comprises one or more of: a multi-link mode in which the STA operates over a first link and a second link at a same time or a single-link mode in which the STA operates over one of the first or second links and communicating with the one or more APs according to the selected mode.

34 Claims, 14 Drawing Sheets

(56) References Cited

U.S. PATENT DOCUMENTS

| | | |
|---|---|---|
| 2018/0270679 A1 | 9/2018 | Laselva et al. |
| 2019/0312815 A1 | 10/2019 | Altman et al. |
| 2019/0335454 A1 | 10/2019 | Huang et al. |
| 2020/0163141 A1 | 5/2020 | Hsu et al. |
| 2020/0221545 A1 | 7/2020 | Stacey et al. |
| 2021/0212062 A1* | 7/2021 | Kurian .............. H04W 72/0453 |

OTHER PUBLICATIONS

International Search Report and Written Opinion—PCT/US2022/071702—ISA/EPO—dated Oct. 5, 2022 (203930WO).

* cited by examiner

STATION PERFORMANCE ENHANCEMENT WITH MULTI-LINK OPERATIONS (MLO)

BACKGROUND

The following relates to wireless communication, including station performance enhancement with multi-link operations.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

SUMMARY

The described techniques relate to improved methods, systems, devices, or apparatuses that support station performance enhancement with multi-link operations. Generally, the described techniques provide for determining when to switch between multi-link operations, such as dual-link operations, and single-link operations when a STA is operating in multi-link operations (MLO). The STA may use metrics such as link congestion, link reliability, and capacity for determining when to communicate via two links or one link, which single link to use if operating via one link. External triggers, such as application requirements, may also influence which operating mode the STA will function in. The techniques described herein provide power savings.

A method for wireless communication is described. The method may include determining at least one network metric related to at least one link between a STA and one or more APs and determining at least one connection parameter related to at least one application operating on the STA. The method may also include selecting a mode of multi-link operations based on the at least one network metric and the at least one connection parameter, where the mode of multi-link operations includes one or more of: a multi-link mode in which the STA operates over a first link and a second link at a same time or a single-link mode in which the STA operates over one of the first link or the second link, and communicating with the one or more APs according to the selected mode of multi-link operations.

An apparatus for wireless communication is described. The apparatus may include a processor, memory in electronic communication with the processor, and instructions stored in the memory. The instructions may be executable by the processor to cause the apparatus to determine at least one network metric related to at least one link between an STA and one or more APs and determine at least one connection parameter related to at least one application operating on the STA. The instructions may also be executable by the processor to cause the apparatus to select a mode of multi-link operations based on the at least one network metric and the at least one connection parameter, where the mode of multi-link operations includes one or more of: a multi-link mode in which the STA operates over a first link and a second link at a same time or a single-link mode in which the STA operates over one of the first link or the second link, and communicate with the one or more APs according to the selected mode of multi-link operations.

Another apparatus for wireless communication is described. The apparatus may include means for determining at least one network metric related to at least one link between an STA and one or more APs and means for determining at least one connection parameter related to at least one application operating on the STA. The apparatus may also include means for selecting a mode of multi-link operations based on the at least one network metric and the at least one connection parameter, where the mode of multi-link operations includes one or more of: a multi-link mode in which the STA operates over a first link and a second link at a same time or a single-link mode in which the STA operates over one of the first link or the second link, and means for communicating with the one or more APs according to the selected mode of multi-link operations.

A non-transitory computer-readable medium storing code for wireless communication is described. The code may include instructions executable by a processor to determine at least one network metric related to at least one link between an STA and one or more APs and determine at least one connection parameter related to at least one application operating on the STA. The code may also include instructions executable by a processor to select a mode of multi-link operations based on the at least one network metric and the at least one connection parameter, where the mode of multi-link operations includes one or more of: a multi-link mode in which the STA operates over a first link and a second link at a same time or a single-link mode in which the STA operates over one of the first link or the second link, and communicate with the one or more APs according to the selected mode of multi-link operations.

In some examples of the method, apparatuses, and non-transitory computer-readable medium described herein, the at least one network metric related to the at least one link may include a first congestion metric of the first link and a second congestion metric of the second link. The method, apparatuses, and non-transitory computer-readable medium may include further operations, features, means, or instructions for determining a composite metric based on the first congestion metric and the second congestion metric, where selecting the mode of the multi-link operations further includes selecting the single-link mode of the multi-link operations when the composite metric may be less than a composite threshold level and selecting the multi-link mode of the multi-link operations when the composite metric may be at or exceeds the composite threshold level.

In some examples of the method, apparatuses, and non-transitory computer-readable medium described herein, selecting the mode of the multi-link operations may include operations, features, means, or instructions for selecting the single-link mode of the multi-link operations when the throughput level of the first link may be at or exceeds the throughput threshold level of the first application and selecting the multi-link mode of the multi-link operations when the throughput level of the first link may be less than the throughput threshold level of the first application.

In some examples of the method, apparatuses, and non-transitory computer-readable medium described herein, selecting the mode of the multi-link operations may include operations, features, means, or instructions for selecting the single-link mode of the multi-link operations over the first link when the first throughput level may be at or exceeds the throughput threshold level, selecting the single-link mode of the multi-link operations over the second link when the first throughput level may be less than the throughput threshold level of the first application and the second throughput level exceeds the throughput threshold level, and selecting the multi-link mode of the multi-link operations when the first throughput level and the second throughput level may be less than the throughput threshold level.

In some examples of the method, apparatuses, and non-transitory computer-readable medium described herein, selecting the mode of the multi-link operations may include operations, features, means, or instructions for selecting the single-link mode of the multi-link operations over the first link when the first latency level may be at or below the latency threshold level, selecting the single-link mode of the multi-link operations over the second link when the first latency level exceeds the latency threshold level and the second latency level may be at or below the latency threshold level, and selecting the multi-link mode of the multi-link operations when the first latency level and the second latency level exceeds the latency threshold level.

In some examples of the method, apparatuses, and non-transitory computer-readable medium described herein, the at least one network metric related to the at least one link may include a combined network metric related to at least the first link and the second link and identifying which mode of the multi-link operations the STA may be to operate in based on the combined network metric.

In some examples of the method, apparatuses, and non-transitory computer-readable medium described herein, selecting the mode of the multi-link operations may include operations, features, means, or instructions for detecting a network condition based on the at least one connection parameter and switching an operating mode of the multi-link mode based on a presence of the network condition.

In some examples of the method, apparatuses, and non-transitory computer-readable medium described herein, switching the operating mode may include operations, features, means, or instructions for switching the operating mode from the multi-link mode to the single-link mode when the first link may have the network condition and the second link does not may have the network condition.

Some examples of the method, apparatuses, and non-transitory computer-readable medium described herein may further include operations, features, means, or instructions for determining that the network condition persists for a time duration, where switching the operating mode may be further based on the network condition persisting for the time duration.

In some examples of the method, apparatuses, and non-transitory computer-readable medium described herein, the network condition includes at least one of a latency requirement, a number of beacon misses being above a beacon miss threshold, or a signal strength value being below a signal strength threshold.

In some examples of the method, apparatuses, and non-transitory computer-readable medium described herein, selecting the mode of the multi-link operations may include operations, features, means, or instructions for selecting the single-link mode of the multi-link operations over the first link, where the at least one network metric related to the at least one link may be a first network metric of the first link, determining that the first network metric may be at or exceeds a threshold level, determining a second network metric of the second link of the multi-link operations based on determining that the first network metric may be at or exceeds the threshold level, and determining whether to switch to operating in the single-link mode of the multi-link operations over the second link based on the second network metric of the second link.

Some examples of the method, apparatuses, and non-transitory computer-readable medium described herein may further include operations, features, means, or instructions for operating in the single-link mode of the multi-link operations over the first link based on the selecting, determining a reliability level related to the second link, and selecting the single-link mode of the multi-link operations over the second link or the multi-link mode of the multi-link operations based on the reliability level related to the second link.

Some examples of the method, apparatuses, and non-transitory computer-readable medium described herein may further include operations, features, means, or instructions for determining that a reliability level related to the first link may be below a reliability threshold, where determining the reliability level related to the second link may be based on the reliability level.

In some examples of the method, apparatuses, and non-transitory computer-readable medium described herein, the at least one network metric related to the at least one link includes a congestion level of the first link or a latency level of the first link.

In some examples of the method, apparatuses, and non-transitory computer-readable medium described herein, determining the at least one network metric may include operations, features, means, or instructions for estimating a congestion level of the first link and the second link.

DETAILED DESCRIPTION

Figure 1:
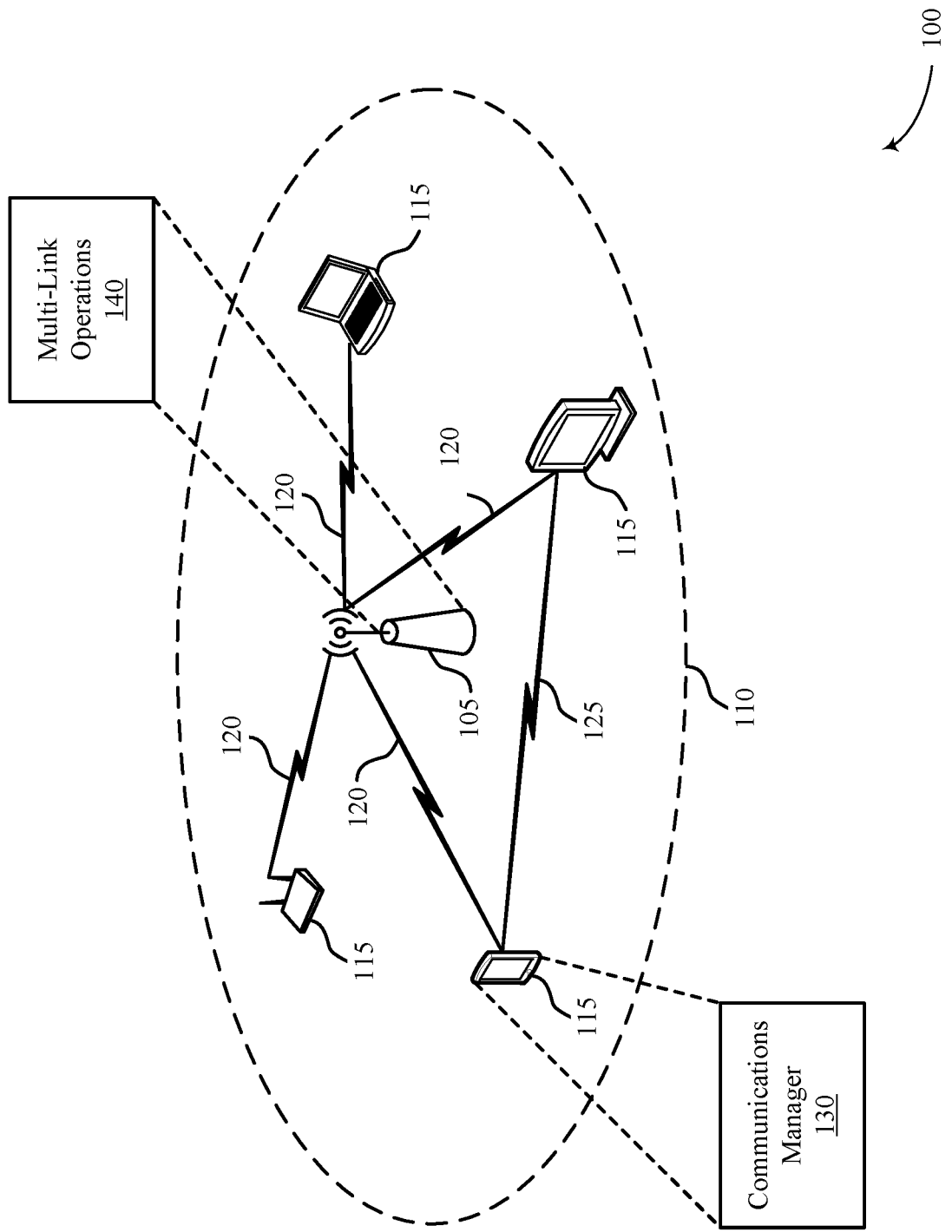
FIG. 1 illustrates an example of a wireless local area network that supports station performance enhancement with multi-link operations in accordance with aspects of the present disclosure.

Techniques are disclosed for performance enhancements for mobile stations (STAs) that are configured for multi-link operations. MLO enables a STA to connect to a single AP over two different radio links or to connect to two different APs at the same time. The two different radio links may be associated with Wi-Fi 2 G, 5 G, or 6 G, Wi-Fi being the technology and 2 G, 5 G and 6 G being different bands of Wi-Fi technology. For example, a STA may be connected to a single AP using 2 G (i.e., 2.4 GHz) and 5 G (i.e., 5 GHz), or 2 G and 6 G (i.e., 6 GHz), or 5 G and 6 G. When connecting to two APs, the STA may use any combination of different channels in one or more bands of Wi-Fi technology. While in MLO, the STA can transmit and receive over the two links at the same time. MLO may enable link aggregation at the media access control (MAC) layer. A link may be mapped to a channel and a band.

When using MLO, a STA may operate in one of several modes, including a multi-link, multi-radio (MLMR) mode, a multi-link, single-radio (MLSR) mode, and a switched MLSR mode. In the MLMR mode, the STA may be connected to one or more APs using two radio links at the same time. That is, the STA may communicate over two or more links at the same time. When in MLMR mode, the STA may operate in asynchronous mode or synchronous mode. In asynchronous mode, the transmissions and receptions can occur at the same time, but independently of each other. That is, in asynchronous MLO mode, the two links are not synchronized with each other (for example, they do not occur dependently at the same time). In synchronous MLO mode, the STA is connected to one or more APs over both links, but the STA is only transmitting on one link at a particular time.

In MLSR mode, the STA may be connected to only one AP over a single link. The STA may determine which link of the multi-links are available to use to make the single connection. In some scenarios, a STA may wish to switch operations from one single link to the other single link. The STA that switches which single link it is using may be referred to as operating in a switched MLSR mode.

The techniques described herein may be used to determine whether to operate in MLO or not. If the STA does operate in MLO, the techniques described herein further determine whether the STA should operate in a multi-link mode, such as a dual-link mode, or single-link mode and how and when it may transition between the modes. If the STA decides to operate in single-link mode, the techniques described herein further determine which link of the available links the STA should use, and when to switch links.

MLO may improve performance of the wireless communications. For example, MLO may provide additive throughput for data flows that are split over the multiple links. That is, the maximum aggregated data rate for using two links at the same time may be higher than using just one of the links. MLO may also reduce latency through having access to multiple links in parallel. MLO may also result in higher reliability of data packets transmitted over the multiple links because the data packets may be duplicated. MLO may also enable different applications to run on a STA to use different links based on the needs of the applications.

While MLO may provide many benefits, operating in MLO may result in a high-power consumption when both links are active and awake. It may be inefficient to keep both links active, especially for STAs which are battery operated devices. Techniques described herein leverage the functionality of MLO when desired for throughput, latency, reliability, or other concerns, but provides power save constraints when a single link would suffice. That is, techniques described herein manage the multiple links, switching between MLO mode and non-MLO mode, taking power consumption into consideration while maintaining the multi-link benefits of throughput and low latency.

Techniques described herein may use network metrics to determine if an MLO enabled STA should operate in a single-link mode, a dual-link mode, a multi-link mode, or switch which single link the STA is using, in order to save power while still meeting requirements for the network or an application being used. The metrics may include link latency, link throughput, link congestion, link capacity, link reliability, application requirements, or the like. Some of the metrics may be estimated or combined across both links. When operating in single-link mode, the STA may probe the other link to determine whether the active link should be switched or if the STA should operate in dual-link mode. When operating in dual-link mode, the STA may occasionally monitor the network metrics to determine if it can switch to single-link mode for power savings.

When a MLO STA is associated with an MLO AP, the MLO STA may make a link selection (e.g., MLMR, MLSR, switched MLSR) based at least in part on the spectral environment and application requirements. For example, the STA may choose to use MLMR when the single links are overloaded, otherwise congested, or too noisy. In some examples, the STA may switch which single link it is using based on these same factors, if one link is improved over the other. Similarly, the STA may use MLMR when running applications with high throughput or low latency requirements, such as streaming, video conferencing, gaming applications, or the like.

Aspects of the disclosure are initially described in the context of wireless communications systems. Aspects of the disclosure are further described with reference to state diagrams, flowcharts, and graphs. Aspects of the disclosure are further illustrated by and described with reference to apparatus diagrams, system diagrams, and flowcharts that relate to station performance enhancement with multi-link operations FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

In some examples, a STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

As illustrated in FIG. 1, the AP 105 includes multi-link operations 140. That is, the AP is configured to establish two or more links with a single STA 115. A STA 115 includes a communications manager 130, which enables MLO techniques for the STA 115. In some examples, the communications manager 130 may provide performance enhancements for MLO for the STA 115.

In some examples, the communications manager 130 may determine at least one network metric related to at least one link between the STA 115 and the access point AP 105 and potentially another AP. The communications manager 130 may determine at least one connection parameter related to at least one application operating on the STA. The communications manager 130 may select a mode of dual-link operations based at least in part on the at least one network metric and the at least one connection parameter, wherein the mode of dual-link operations comprises one or more of: a dual-link mode in which the STA operates over the first link and the second link at a same time or a single-link mode in which the STA operates over one of the first link or the second link. The communications manager 130 may communicate with the one or more APs according to the selected mode of dual-link operations.

The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, including 802.11be (also known as Extremely High Throughput (EHT)), the Bluetooth® standard, code division multiple access (CDMA), frequency-division multiple access (FDMA), time-division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone Service (AMPS), or other known signals that are used to communicate within a wireless, cellular or internet of things (IOT) network, such as a system utilizing 3G, 4G or 5G, or further implementations thereof, technology.

Figure 2:
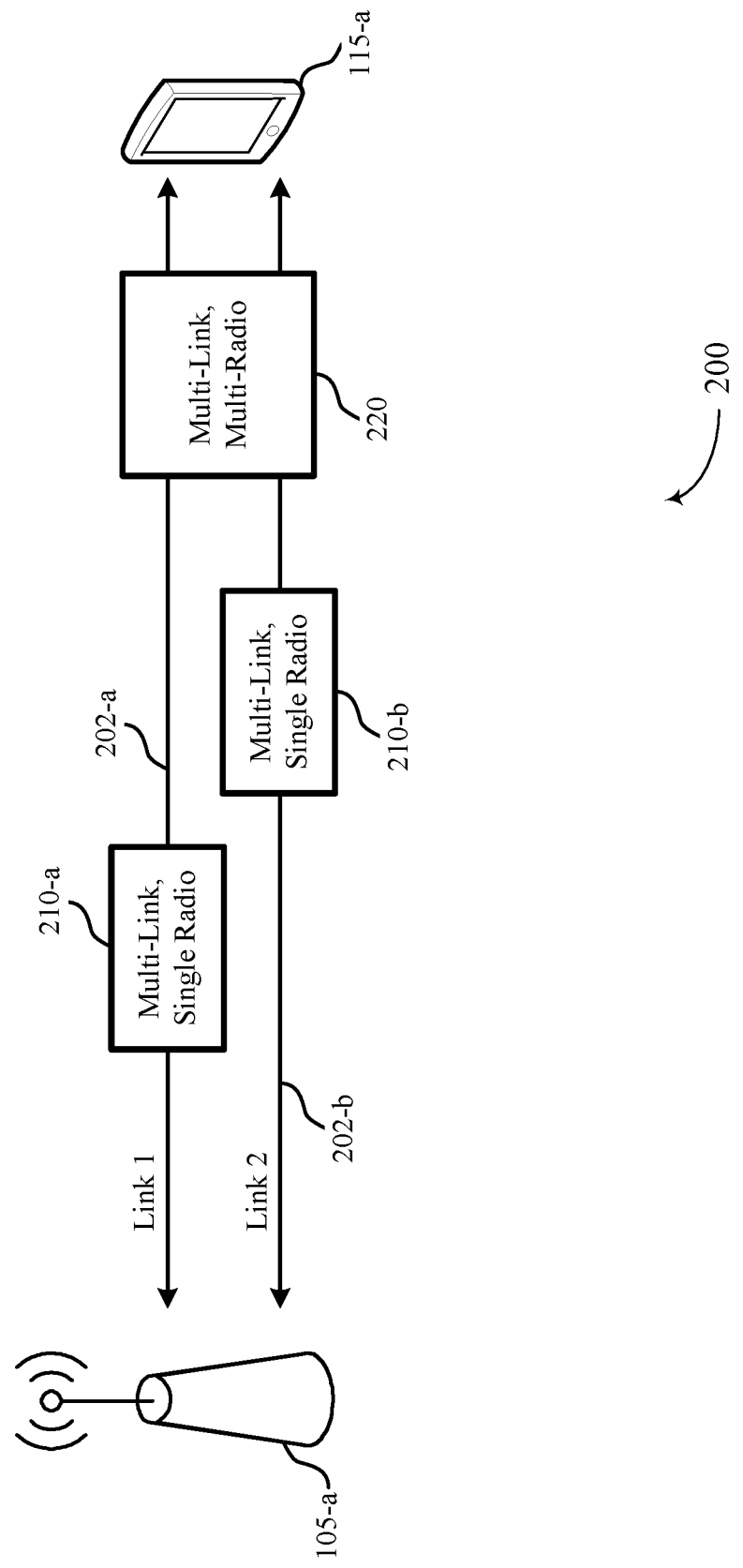
FIG. 2 illustrates an example of a wireless communications system that supports station performance enhancement with multi-link operations in accordance with aspects of the present disclosure.

FIG. 2 illustrates an example of a wireless communications system 200 that supports station performance enhancement with multi-link operations in accordance with aspects of the present disclosure. The wireless communications system 200 may include an AP 105-a and a STA 115-a. The AP 105-a be an example of aspects of an AP as described herein. The STA 115-a be an example of aspects of a STA as described herein. FIG. 2 illustrates potential wireless links connecting the STA 115-a with the AP 105-a.

The AP 105-a and the STA 115-a may be in wireless communication with each other over one or more links. For example, the AP 105-a and the STA 115-a may be connected via one or more of a first link 202-a or a second link 202-b. If the STA 115-a is connected to the AP 105-a with a single link, the STA 115-a is operating in MLSR mode. For example, if the STA 115-a is connected to AP 105-a via just the first link 202-a (represented by MLSR 210-a), then the STA 115-a is operating in a single-link mode. Likewise, if the STA 115-a is connected to AP 105-a via just the second link 202-b (represented by MLSR 210-b), then the STA 115-a is operating in the single-link mode. Alternatively, if the STA 115-a is connected to the AP 105-a via both the first link 202-a and the second link 202-b (represented by MLMR 220), then the STA 115-a is operating in dual-link mode.

In other examples, the STA 115-a could be connected via one of the first link 202-a or the second link 202-b with a second, different AP. If the STA 115-a was connected to the AP 105-a and the second AP, then the STA 115-a would be operating in dual-link mode. In some examples, the STA 115-a may connect to the AP 105-a via three or more links or to two or more APs 105 via separate links.

The STA 115-a may operate in single-link mode when the single link meets throughput demands, the congestion on the single link is at or below a congestion threshold, when throughput for the single link is at or above a throughput threshold, when the link reliability is at or above a link reliability threshold, when the aggregated throughput of both links does not indicate MLMR, or when one or more applications running on the STA 115-*a* that are using the wireless connection allows a single link. In other cases, other factors may be used to determine when to operate in single-link mode. In some examples, if the single link that is being used begins to fail to meet one or more of the requirements, the STA 115-*a* may probe the other link to determine if the STA 115-*a* should switch to that link. In some examples, the STA 115-*a* may use the single link with the better metrics. For example, the STA 115-*a* may operate in switched MLSR mode if the current link is unreliable. However, if neither link on its own would satisfy communication needs at the time, the STA 115-*a* may operate in multi-link mode.

Techniques described herein enable the STA 115-*a* to reduce power consumption by operating in single-link mode as long as it is permitted by any constraints of latency and throughput for applications the STA 115-*a* is running. The STA 115-*a* may engage in dual-link mode to improve latency and reliability. In some examples, the STA 115-*a* may operate in dual-link mode to achieve or maintain high throughput or if network congestion is too high for single-link mode, when the throughput on both links is not less than the throughput on either link. In some examples, the STA 115-*a* may use MLMR to reduce latency by having the increased band diversity that comes from using two separate links, when triggered by an application, host, or Wi-Fi latency manager (WLM), or inferred based on channel metrics.

Figure 3:
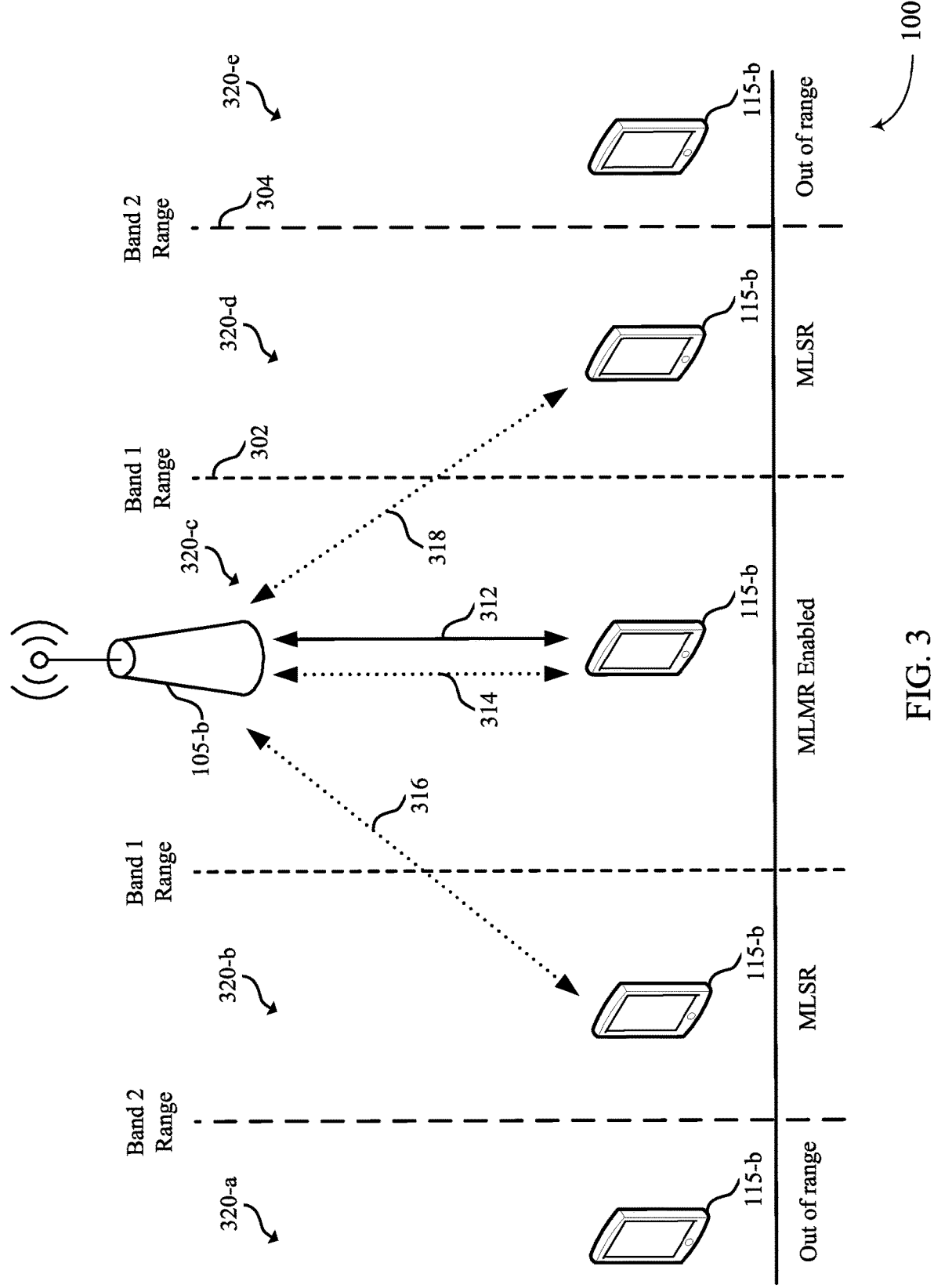
FIG. 3 illustrates another example of a wireless communications system that supports station performance enhancement with multi-link operations in accordance with aspects of the present disclosure.

FIG. 3 illustrates another example of a wireless communications system 300 that supports station performance enhancement with multi-link operations in accordance with aspects of the present disclosure. The wireless communications system 300 may include an AP 105-*b* and a STA 115-*b*. The AP 105-*b* may be an example of aspects of an AP as described herein. The STA 115-*b* be an example of aspects of a STA as described herein. FIG. 3 illustrates the different links available to the STA 115-*b* when roaming within the wireless communications system 300.

FIG. 3 shows the STA 115-*b* within different regions 320-*a* through 320-*e* throughout the wireless communications system 300. At each region, the possible links that may be available to the STA 115-*b* from the AP 105-*b* are shown. The AP 105-*b* may support multiple bands of Wi-Fi technology and the STA 115-*b* may be an MLO device that also supports multiple bands of Wi-Fi technology. For example, in FIG. 3, the AP 105-*b* supports two or more bands of Wi-Fi technology, such as band 1 and band 2. The range of band 1 is smaller than the range of band 2. band 1 may be 2 G and band 2 may be 5 G or 6 G, for example.

When the STA 115-*b* is within regions 320-*a* or 320-*e*, the STA 115-*b* is out of range of both band 1 and band 2, and cannot use either links for either band. When the STA 115-*b* is at regions 320-*b* or 320-*d*, it is within range of RAT 2 but not within range of band 1. Therefore, at these regions, the STA 115-*b* may operate in MLSR mode but not in MLMR mode. Therefore, the STA 115-*b* may only connect to the AP 105-*b* via a single link over band 2. However, if there was another AP within range, the STA 115-*b* may connect to that AP using a different link and may thus operate in MLMR mode.

When the STA 115-*b* is within region 320-*c*, it is within the range of both band 1 and band 2. Therefore, the STA 115-*b* may have MLMR enabled and may operate in dual-link mode, connected to the AP 105-*b* over two different links.

Because STA 115-*b* may be mobile and see rapid changes in a received signal strength indicator (RSSI) as it moves from one AP 105 to another, techniques described herein enable the STA 115-*b* to seamlessly handle MLO transitions. MLO may enable the STA 115-*b* to associate with multiple links even when some of the links may be out of range, such as in regions 320-*a*, 320-*b*, 320-*d*, and 320-*e*. The techniques described herein enable the STA 115-*b* to dynamically switch between operating modes based on factors including network congestion, link availability, link reliability, throughput levels, noise, application requirements, and the like, while also selecting the operating mode and link based on power savings considerations.

Table 1 provides an example of the different states that a STA may be in, which includes MLMR and MLSR. The table shows the multicast listener discovery (MLD) state, the highest level state the STA operates in, which may be MLMR, MLSR, or non-MLD. Table 1 also shows the link state (active, beacon mode power save (BMPS), link mode power save (LMPS), or inactive), the virtual device (v-dev) state, protocol state, chip power state, timer interrupt enabled (TIM interrupt EN), RSSI/$B_{MISS}$ interrupt enabled, and power level of the STA.

TABLE 1

| MLD state | Link State | v-dev State | Protocol state | Chip power state | TIM interrupt EN? | RSSI/$B_{MISS}$ Interrupt EN? | Power level |
|---|---|---|---|---|---|---|---|
| MLMR | Active | Up | PM 0 | Awake | N | Y | High |
| MLSR | BMPS | Up | PM 1 | Sleep (HW-DTIM) | Y | Y | Medium |
| MLSR | LMPS | Up | PM 1 | Sleep (LMPS) | N | N | Low |
| Non-MLD | Inactive | Inactive | N/A | Sleep (IMPS) | N | N | Low |

As shown in Table 1, the STA may operate in the MLMR mode for high performance, with high power usage. Additionally, the STA may have MLMR active but not be using both links. That is, sometimes when operating in MLMR, the STA may not actually be operating in MLMR mode, but may be using a single link. Some MLSR use cases may include a standby mode where one of the radio links is in delivery traffic indication message (DTIM) mode and the other link is in active mode. The STA may operate with one link in BMPS mode and the other link in a complete silent mode, in order to save power. As conditions change, the thresholds to move between the MLSR-LMPS to MLSR-BMPS to MLMR may be reached.

The STA may change its state by sending a packet on one of the links. The STA may determine one or more metrics associated with the links, combine the metrics, and determine if the STA should add the second link based on the metrics. When the STA does not want to add the second link, it may be closed by putting it into a link mode power save (LMPS) sleep. LMPS sleep may include an active v-dev state, but with PM=1 and all traffic identifiers (TIDs) paused. The STA may notify the AP that the second link is in LMPS sleep. Based on this indication, the AP will not send any notifications on the second link, and communications will proceed as if there is only a single link until the second link is woken up. In some examples, the second link will wake up, listen for a beacon, and then return to sleep. If the AP has any data for the STA on the second link, the AP may indicate it as normal.

Figure 4:
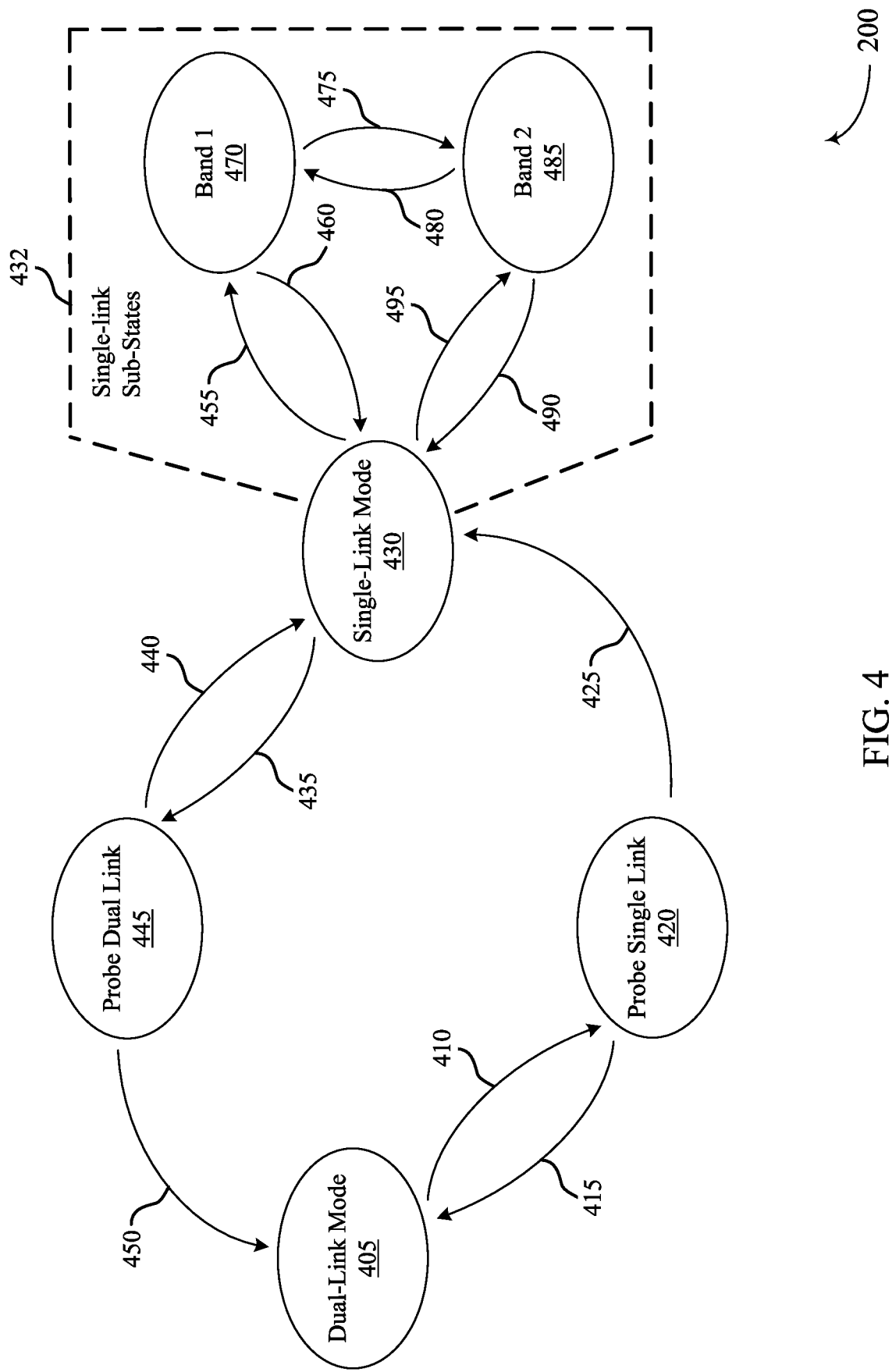
FIG. 4 illustrates another example of a finite state machine that supports station performance enhancement with multi-link operations in accordance with aspects of the present disclosure.

FIG. 4 illustrates an example of a finite state machine 400 that supports station performance enhancement with multi-link operations in accordance with aspects of the present disclosure. The finite state machine 400 may be implemented within a STA such as any STA as described herein. The finite state machine 400 includes states for a dual-link mode 405, probe single-link 420, a single-link mode 430, and probe dual link 445. The finite state machine 400 also illustrates some single-link sub-states 432 for the single-link mode 430.

The STA may use one or more metrics when determining in which operating mode to operate or whether to initiate MLO or tear down MLO. External triggers may be used, including being triggered by a WLM or high-level operating system (HLOS), beacon miss ($B_{MISS}$) counter breaches, or beacon RSSI breaches. An external trigger may be any factor outside of the WLAN physical (PHY) or MAC layers. External triggers may also include roaming, triggers from applications, Transmission Control Protocol (TCP) window size, backhaul network capacity, and battery power level. Initiating MLO may be triggered by roaming from a non-MLO AP to an MLO AP, high throughput or low latency applications running, WLM indicating low or ultra-low latency mode, an increase in transmission or reception TCP window size that can accommodate MLO high throughput, an increase of backhaul network capacity that can accommodate MLO high throughput, or battery power exceeding a certain threshold. Turning off MLO may be triggered by the opposite changes of those described above. In some examples, these external factors may only take effect when they are detected by the STA. In some examples, these external factors may not have any impact on which of the two links to be used in single-link mode.

Internal triggers may include network metrics regarding traffic and congestion, reliability, and capacity. These checks or estimations of the internal triggers may be performed periodically or when triggered by a changing condition (e.g., an increase or reduction in throughput, moving locations, link failure, etc.).

Internal triggers may be used, which may include a composite metric, denoted $C2_{MLO}$, corresponding to a joint traffic and congestion estimation across both links, a reliability estimator R2, and a capacity metric C1. In some examples, the estimations may be performed by a metric manager, such as a metric manager 1125. These internal triggers may be connection parameters.

Table 2 provides example MLO link states for a 2G link and a 5/6G link, and some of their advantages. For the MLSR states with use cases DTIM, the link selection for BMPS and LMPS may be made based on RSSI and the reliability metric. These states may be controlled by an adaptive inactivity management algorithm, such as an adaptive power save (APS) like QPower, or a target wake time (TWT). In some examples, the APS may be an algorithm that uses traffic and congestion of a medium to adapt data-inactivity and save power thereof. In these states, MLO may provide improved functionality over dual band simultaneous (DBS) operations. The LMPS mode may result in power savings because there are no beacon wakeups for a link in LMPS mode. For the MLSR states with use case for low/medium traffic, there is a balance between power use and traffic latency. The final link selection between which of the two single links to use may be based on the reliability metric. The MLMR state provides increased throughput and reduced latency.

TABLE 2

| MLD state | Use case | Controlled via | 2 G link | 5/6 G link |
|---|---|---|---|---|
| MLSR | DTIM | APS or TWT | BMPS | LMPS |
| MLSR | DTIM | APS or TWT | LMPS | BMPS |
| MLSR | Low/med traffic | C2, R2, C1 estimator | LMPS | Active |
| MLSR | Low/med traffic | C2, R2, C1 estimator | Active | LMPS |
| MLMR | Increased performance | C2, R2, C1 estimator | Active | Active |

The network metrics C2, R2, and C1 may be used to determine when to move between MLSR and MLMR. These metrics may be calculated or estimated at the STA.

The STA may check or estimate traffic and congestion levels (referred to herein as C2) for the links. In some examples, the STA may determine $C2_{MLO}$, corresponding to a composite traffic and congestion estimation across both links. The per-link traffic and congestion metric may be denoted as $C2_i$, wherein i corresponds to the specific link (e.g., 2 G, 5G, 6G, etc.). Whenever both links are being used, the STA may estimate the $C2_i$ for each link. The congestion estimation may be used during Q-Power wireless charging and may help adapt an inactivity timeout for power management. The congestion estimation may also allow for accurate modelling of traffic and congestion. A higher C2 estimate implies more collisions and wasted energy due to more listen intervals, and may be used to open the second link to diversify data traffic. Furthermore, MLO helps in obtaining more throughput while at the same time lowering the C2 estimate on each link, thereby lowering the inactivity timeout associated with it, and thereby lowering overall power consumption.

The per-link $C2_i$ values may be estimated according to Equation 1:

$$C2_i = F\left(\frac{\sum(a \cdot allothers + \beta \cdot myTxRx)}{T_{obs}}\right) \quad (1)$$

wherein i=1, 2, etc., allothers corresponds to ambient traffic in the environment (rx_clear_cnt), myTxRx corresponds to directed traffic from the STA (myrx_frame_cnt and tx_frame_cnt). The C2 estimate may perform a slow averaging (F) of directed traffic with ambient Wi-Fi traffic in a configurable fraction, which may allow for nearly accurate prediction of ingress traffic in the presence of congestion in the channel. F may represent a filter, which may be, for example, a one- or two-tap filter. The filter may be averaged over all observation windows. The STA may maintain band specific profiling, indicating how the C2 estimate may change for a given throughput for each band. Higher traffic or higher congestion results in a larger C2. Inversely, lower traffic and lower traffic results in a smaller C2.

The composite congestion metric, $C2_{MLO}$, may provide a joint weighted metric across both links. $C2_{MLO}$ may be determined according to Equation 2:

$$C2_{MLO} = \gamma C2_1 + (1-\gamma)C2_2 \quad (2)$$

wherein γ, related to the bandwidth of the links, is provided as in Equation 3:

$$\gamma = \frac{BW_1}{(BW_1 + BW_2)} \quad (3)$$

Table 3 provides an example C2 versus a Data Inactivity TimeOut (D-ITO) look-up table (e.g., an APS look-up table), which shows transition points for MLO, with a hysteresis phase for up or down transitions. For C2 estimates between 0 and 60, power consumption may be better in single-link mode. For C2 estimates between 61 and 70, single-link mode or dual-link mode may be suitable. For C2 estimates between 71 and 90, the STA may operate in MLO mode.

TABLE 3

| C2 Estimate | ITO RAT 1 | ITO RAT 2 |
|---|---|---|
| 0-15 | 50 | 30 |
| 16-30 | 50 | 30 |
| 31-45 | 50 | 40 |
| 46-60 | 50 | 40 |
| 61-70 | 50 | 50 |
| 71-80 | 100 | 100 |
| 81-90 | 200 | 200 |

Table 3 may be modified to include transition points for MLO with hysteresis phase for Up/Down transitions. A range may be determined where the MLO state does not change between on/off, in order to reduce unnecessary switching. In this example, for MLO to be turned on from being off, the C2 estimate should exceed 60. For MLO to go from on to off, the C2 should drop below 45. In other examples, other values may be used. In some examples, the C2 estimate may be based only on those link which are currently active.

The STA may also perform a reliability estimation of the reliability levels of the one or more links. The reliability metric may be denoted R2. The per-link reliability metric may be denoted as $R2_i$. A reliability estimator may determine a reliability of one or both links. This may be used to switch between links in MLSR or to change between MLSR and MLMR. When the STA is approaching conditions to move from MLSR to MLMR, the STA may determine whether the second link that may be added is reliable. If the second link is not very reliable (for example, many failures or retransmissions), adding the second link would increase power consumption but may not provide much increase in throughput. When the second link is unreliable, the STA may not switch to MLMR. The reliability estimator determines whether the second link is reliable, by considering how many times are retransmissions happening, the length of time for channel access, and transmission completion failures (e.g., no acknowledgement (ACK) or packet expires and is never transmitted). The sum of these factors may be a metric related to reliability.

The reliability metric, R2, may be determined according to Equation 4:

$$R2 = 1 - F(\Sigma_{i=1}^{4} \alpha_i M_i) \quad (4)$$

The coefficients α may be determined based on observation or simulation. Equation 4 may be a slow averaging function, a running average, or any mathematical filter. A larger R2 implies the link is more reliable. The link reliability may be determined in four phases ($M_i$). In $M_1$, retransmissions on transmit are checked. More retransmissions may lead to progressively lower modulation and coding scheme (MCS) selection, which may signal a spiral of higher power consumption and increased latency. $M_1$ may be defined as the number of retransmissions divided by the total number of transmissions.

In $M_2$, retransmissions on receive are checked. The reliability for phase may be inferred by monitoring a "Retry" bit in subsequent physical layer protocol data units (PPDUs) or by detecting holes in sequence number spaces. $M_2$ may be defined as the number of received retired MAC packet data units (MPDUs) divided by the total number of received MPDUs.

In $M_3$, the channel access latency for transmit per access channel may be checked. This may be estimated per packet based on a per-queue back-off counter increase and may provide a measure of increased latency. The access latency may be evaluated only when the STA has packets in the buffer. The medium access latency may include the backoff duration and the wait time for the medium to become idle. $M_3$ may be defined as iAccessLatencyi divided by $T_{obs}$, where AccessLatencyi is a medium access latency for schedule command i after it is posted to the hardware and $T_{obs}$ is an observed time. In other examples, other ways of calculating the channel access latency may be determined.

In $M_4$, the number of transmit completion failures is determined. The number of transmit completion failures may be the number of packets dropped due to collisions, clobbering, or a timer expiration. $M_4$ may be defined as the number of dropped packets divided by the total number of transmitted packets.

The STA may also check link capacity. The combined capacity metric may be referred to as C1. The per-link capacity metric may be denoted $C1_i$. A capacity estimator may also determine the capacity (C1) of the network per link. The STA may use the capacity metric to select which link to use when transitioning from MLMR to MLSR. The capacity per link may be continuously or periodically estimated during the MLMR operational state, according to Equation 5, and a variance (D1) may be determined according to Equation 6:

$$C1 = \alpha_{ave_{i \in Tx}}(\text{Rate}_i(1-\text{PER})_i) + \beta_{ave_{j \in Rx}}(\text{RxBytes}_j/T_{Rx\_j}) \quad (5)$$

$$D1 = \alpha_{var_{i \in Tx}}(\text{Rate}_i(1-\text{PER})_i) + \beta_{var_{j \in Rx}}(\text{RxBytes}_j/T_{Rx\_j}) \quad (6)$$

The determination of which link to select may be based on selecting the link with the higher C1, which may represent higher potential throughput, or selecting the link with the lower D1, which may represent lower channel fluctuation due to collision/clobbering, or lifetime expiry. In some examples, the link capacity metrics may be evaluated in MLMR state every periodic interval of "X" milliseconds (ms) for step up and down functions.

An MLO enabled STA may dynamically change the operating links based on power and performance requirements. The STA may step down (e.g., from MLO being on to being off) or step up (from MLO being off to being on). Historical metrics or probing techniques may be used to determine which mode to operate in.

Returning now to FIG. 4, for purposes of illustration, consider that the STA is operating in the dual-link mode 405. This means that MLO is enabled and the STA is connected to one or more APs over two links. The STA may be operating in dual-link mode 405 due to application requirements, the spectral environment, or the like. However, the dual-link mode may be very power consumptive, so the STA may assess whether switching to single-link mode may be possible in order to save power.

The STA may determine whether $C2_{MLO}$ is equal to or less than a congestion level threshold (path 410). If the composite congestion level is less than a threshold (probe_1link_threshold), then the STA switches to the probe single-link 420 state.

At the probe single-link 420 state, the STA may check the reliability of the links. If the reliability of both links R2 are equal to or greater than a reliability threshold (path 425), the STA moves to the single-link mode 430. Additionally (path 425), if either link's $C2_i$ is less than the probe_1link_threshold and R2 is greater than the reliability threshold, then the STA moves to the single-link mode 430. Alternatively (path 415), if both links' $C2_i$ is less than a probe_2link_threshold or both links' R2 is less than the reliability threshold, then the STA stays in the dual-link mode 405.

While operating in the single-link mode 430, the STA may switch between the different links, as shown in the single-link sub-states 432. Band 1 470 may be selected based on C1, R2, or host or application preference (path 455). Similarly, band 2 485 may be selected based on C1, R2, or host or application preference (path 495). The links may be switched based on RSSI being less than an RSSI threshold for the given link or the $B_{MISS}$ count being greater than a $B_{MISS}$ threshold (paths 475 and 480). The STA may probe the links for moving into MLMR based on a dual-link event (paths 460 and 490).

In single-link mode 430, the STA may move into a state that probes the dual link (445) when the latency is above a threshold or $C2_i$ is greater than the probe_2link_threshold (path 435). The STA may stop probing dual-link mode 445 when the second link R2 is below the reliability threshold (path 440). As used herein, the second link is the link that the STA is not using in single-link mode.

From probing dual link while operating in the single-link mode 430, the STA may move back into dual-link mode 405 if the reliability R2 of the second link is greater than or equal to the reliability threshold (path 450).

This is just one example of transitioning between MLMR, MLSR, and switched MLSR. There may be other thresholds, metrics, or parameters used to make these transitions in other examples. While the example of FIG. 4 is directed to the operational states being changed due to network metrics (e.g., congestion, reliability, capacity, etc.), the operational states of the STA may also change due to internal triggers, such as an application requesting a change or based on a connection parameter.

Figure 5:
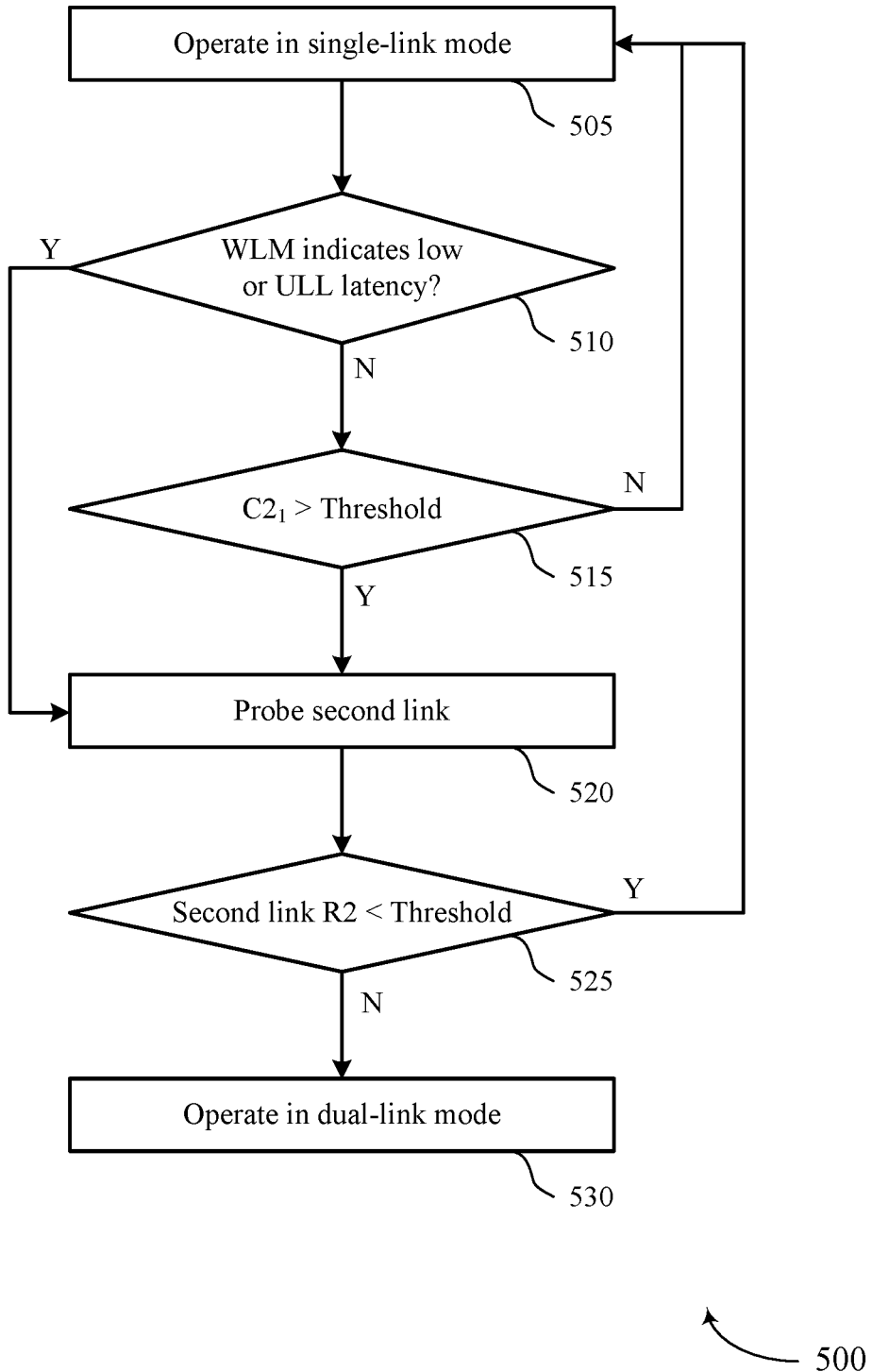
FIG. 5 illustrates an example of a flowchart that supports station performance enhancement with multi-link operations in accordance with aspects of the present disclosure.

FIG. 5 illustrates an example of a flowchart 500 that supports station performance enhancement with multi-link operations in accordance with aspects of the present disclosure. The operations of the flowchart 500 may be implemented by a STA or its components as described herein. For example, the operations of the flowchart 500 may be performed by a STA as described with reference to FIGS. 1 through 4 and 8 through 13. In some examples, a STA may execute a set of instructions to control the functional elements of the STA to perform the described functions. Additionally, or alternatively, the STA may perform aspects of the described functions using special-purpose hardware.

The flowchart 500 illustrates an example of the STA moving from MLSR to MLMR. At 505, the STA is operating in MLSR. At 510, the STA determines if the WLM latency is at or above a latency threshold. If so, the STA begins to probe on the dual link (e.g., the second link) at 520. If the WLM latency below the latency threshold, the STA determines whether the $C2_i$ is greater than a threshold (e.g., Probe_2Link_Threshold). If not, the STA stays in single-link mode. In some examples, MLMR is initiated if the above conditions persist for more than a predetermined time period of observation (e.g., on the order of ms).

At 520, the STA probes the second link. If the reliability of the second link, R2, is less than the reliability threshold at 525, the STA stays in single-link mode at 505. If not, the STA operates in dual-link mode at 530. In some examples, R2 may be observed for the new link to ensure that the second link is worth using for MLMR. In some examples, the host or application may bring up the second link, set low latency requirements through WLM, and forward the enabled second link upon notification by the WLM. The host or application may set at least one connection parameter, such as a low latency requirement, a throughput requirement, a reliability requirement, or the like.

Figure 6:
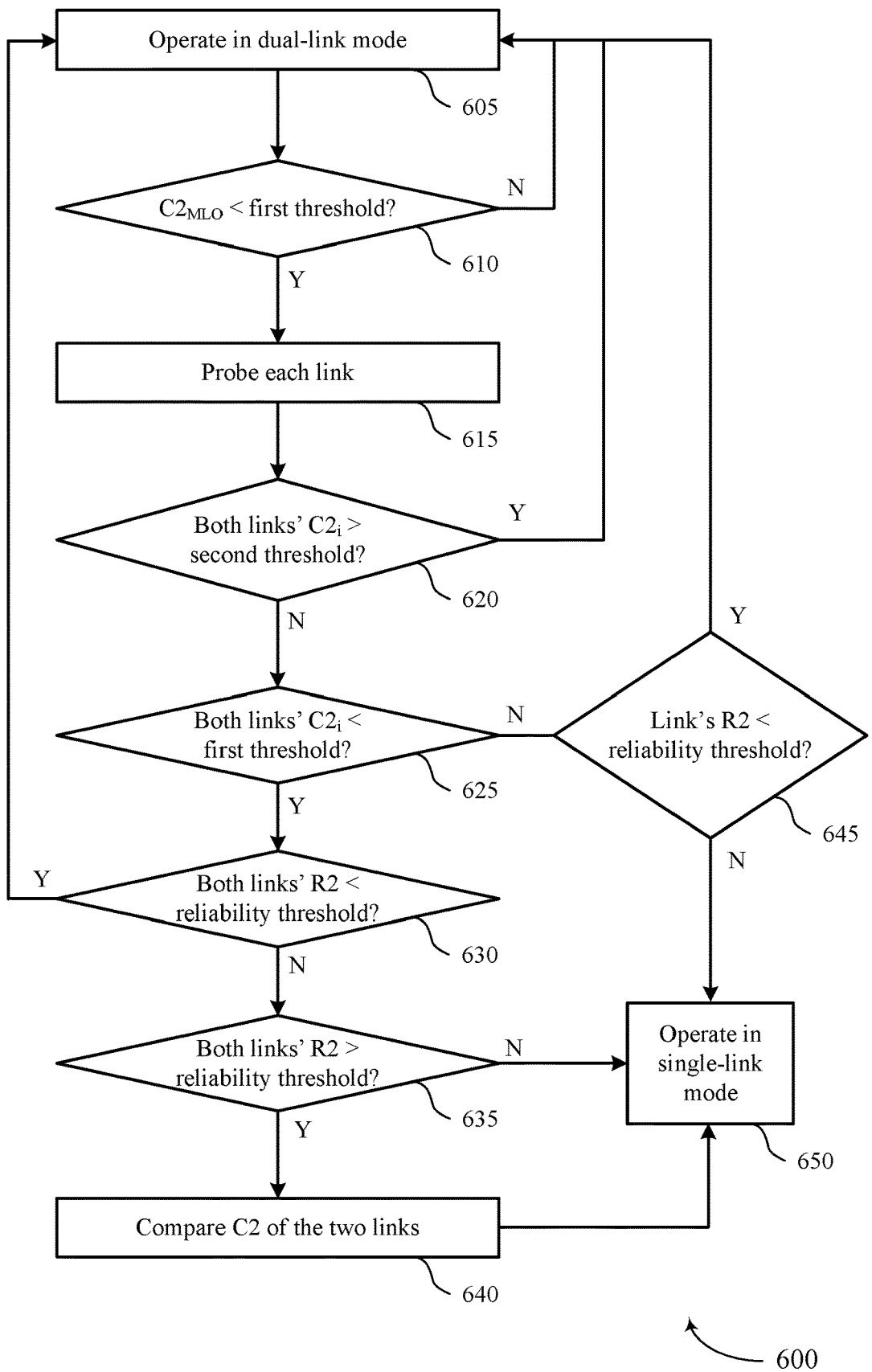
FIG. 6 illustrates an example of a flowchart that supports station performance enhancement with multi-link operations in accordance with aspects of the present disclosure.

FIG. 6 illustrates an example of a flowchart 600 that supports station performance enhancement with multi-link operations in accordance with aspects of the present disclosure. The operations of the flowchart 600 may be implemented by a STA or its components as described herein. For example, the operations of the flowchart 600 may be performed by a STA as described with reference to FIGS. 1 through 4 and 8 through 12. In some examples, a STA may execute a set of instructions to control the functional elements of the STA to perform the described functions. Additionally, or alternatively, the STA may perform aspects of the described functions using special-purpose hardware.

The flowchart 600 illustrates an example of the STA moving from MLMR to MLSR. In this example, the $C2_{MLO}$ and $R2_i$ are initiated, and $C1_i$ is qualified. The STA may be operating in dual-link mode at 605. That is, $C2_{MLO}$, $R2_i$, and $C1_i$ may be measured continuously or periodically during the MLMR operations. At 610, the STA may determine whether $C2_{MLO}$ is below a first threshold (e.g., probe_1link_threshold). If not, the STA remains in dual-link mode. If so, the STA probes each link at 615, because the level of composite congestion is not enough to warrant use of MLO.

At 620, if both links $C2_i$ is greater than the threshold (e.g., probe_2link_threshold), then the STA remains in dual-link mode. If not, both links have a low congestion score, and the STA determines whether both links' $C2_i$ are less than the first threshold (e.g., probe_1link_threshold) at 625. If not, the STA may consider that only the link I with $C2_i$ is lower than the first threshold (e.g., probe_1link_threshold—at least one $C2_i$ will be below the first threshold as $C2_{MLO}$ may be below threshold) and proceed to 645. At 645, the STA checks for the link's R2 to be less than the reliability threshold at 640. If so, the STA operates in dual-link mode at 605. If not, the flowchart proceeds to 650.

If both links' $C2_i$ are not less than the first threshold, then both links' R2 reliability is checked against a threshold at 630. If both links' R2 are below the threshold, the STA operates in dual-link mode. If not, the flowchart 600 proceeds to determine whether both links' R2 are above the threshold at 635. If not, the flowchart 600 proceeds to 650 and may consider that only the link i for which R2 is greater than the first threshold. If so, the STA compares the C2 of the two links to select which link to use. The STA may select the link i with the lower $C2_i$ for all links. At 650, the STA operates in single-link mode. Alternatively, at 635, the STA may select the link i for which R2 is greater than the first threshold to operate in for single-link mode without checking the R2 of the other link.

Figure 7:
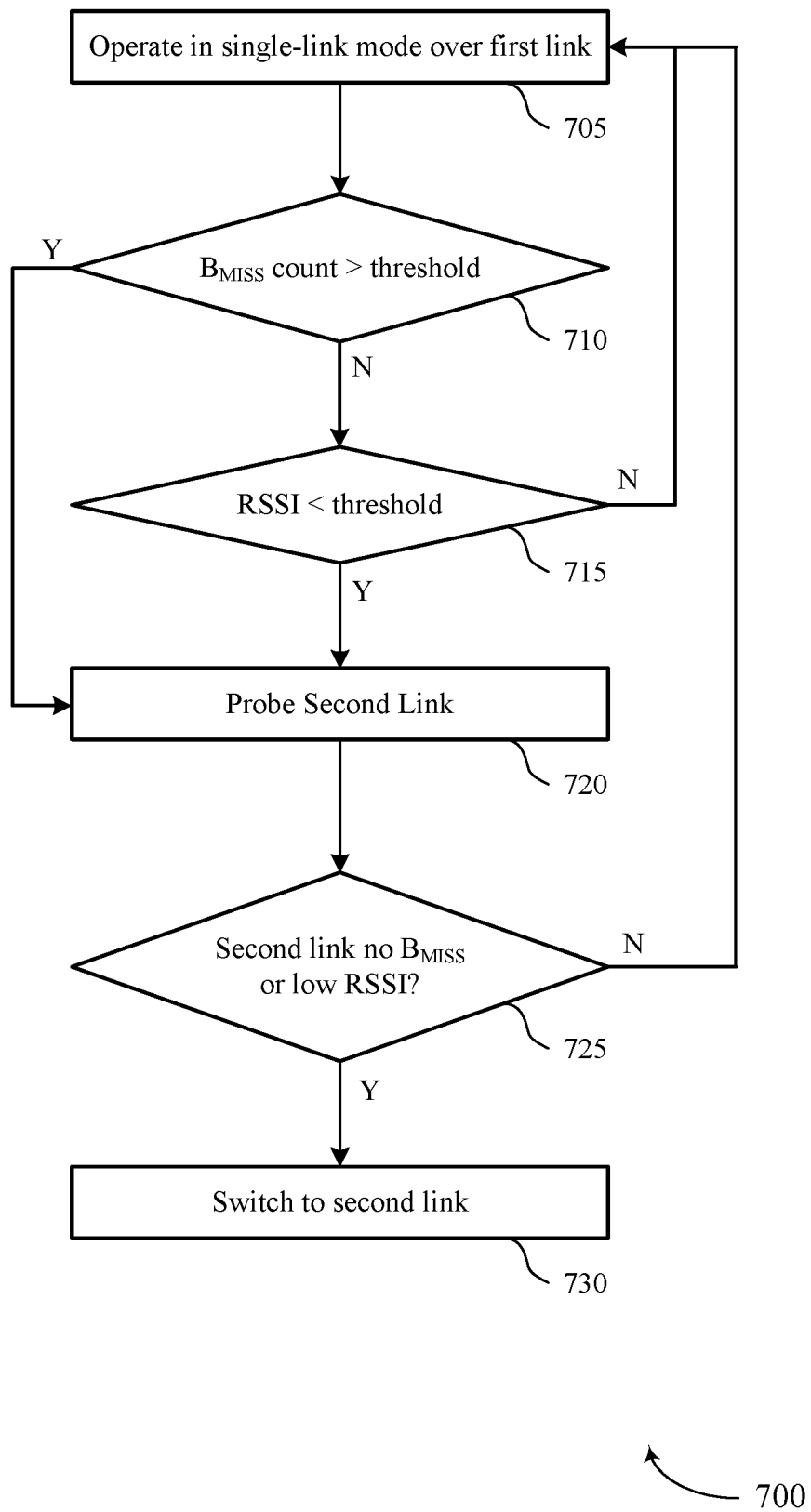
FIG. 7 illustrates an example of a flowchart that supports station performance enhancement with multi-link operations in accordance with aspects of the present disclosure.

FIG. 7 illustrates an example of a flowchart 700 that supports station performance enhancement with multi-link operations in accordance with aspects of the present disclosure. The operations of the flowchart 700 may be implemented by a STA or its components as described herein. For example, the operations of the flowchart 700 may be performed by a STA as described with reference to FIGS. 1 through 4 and 8 through 12. In some examples, a STA may execute a set of instructions to control the functional elements of the STA to perform the described functions. Additionally, or alternatively, the STA may perform aspects of the described functions using special-purpose hardware.

The flowchart 700 provides an example of switched MLSR. In this example, when $C2_i$, for given link i, does not qualify for MLMR but remaining in MLSR may be recommended for power savings (e.g., $C2_i$<Probe_2Link_Threshold). At 705, the STA is operating in single-link mode over a first link. At 710, the STA determines whether a $B_{MISS}$ count for the first link is above a beacon miss threshold. If so, the STA probes the second link at 720 because the first link may not be reliable. If not, the STA checks whether the RSSI for the first link is less than an RSSI threshold. If not, the STA continues to operate in single-link mode over the first link. If so, the STA probes the second link at 720.

At 720, the second link is probed. The STA may temporary initiate MLMR to probe the second link's $B_{MISS}$ and RSSI for a time period (e.g., milliseconds) before switching to MLSR again. At 725, the second link is checked for $B_{MISS}$ or low RSSI. If there is $B_{MISS}$ or latency is high, the STA stays operating over the first link at 705. If not, the STA proceeds to switch to operating over the second link at 730.

Figure 8A:
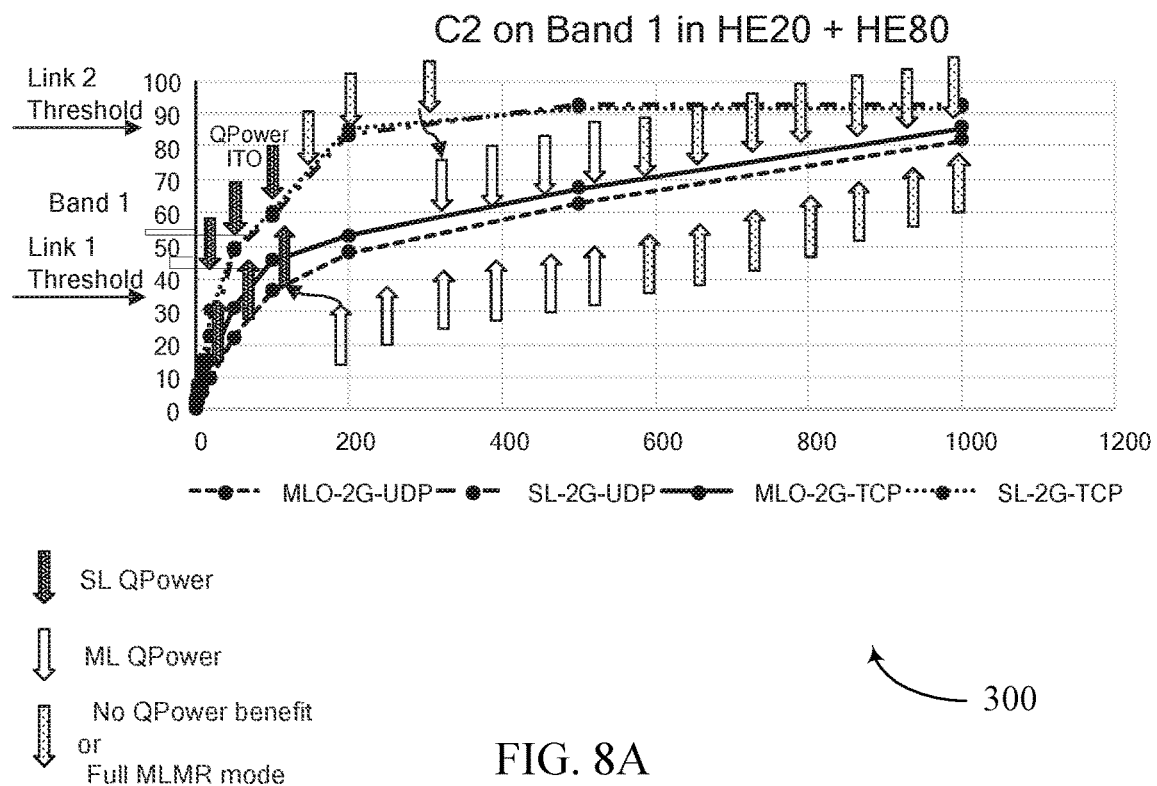
FIGS. 8A-8B illustrate examples of graphs that support station performance enhancement with multi-link operations in accordance with aspects of the present disclosure.

FIG. 8A illustrates an example of a graph 800 that supports station performance enhancement with multi-link operations in accordance with aspects of the present disclosure. The graph 800 shows C2 v. throughput over two different frequency bands. In this example, the Wi-Fi technology is 2 G and the bandwidths are HE 20 and HE 80. The graph 800 shows two thresholds, a link 2 threshold between 80 and 90 (for C2) and a link 1 threshold between 30 and 40. Between these thresholds (hysteresis), the STA may not switch operations between MLSR and MLMR. Outside of these thresholds, the STA may switch operations.

Figure 8B:
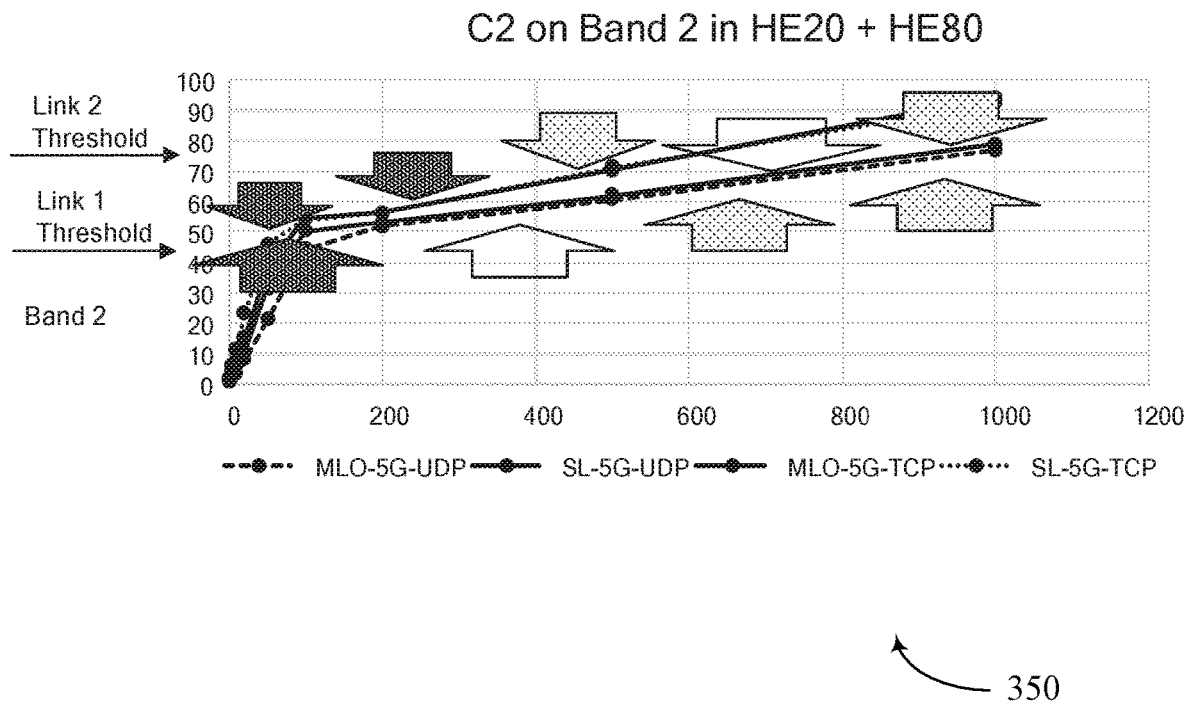

FIG. 8B illustrates an example of a graph 850 that supports station performance enhancement with multi-link operations in accordance with aspects of the present disclosure. The graph 850 shows C2 v. throughput over two different frequency bands, and is complementary to graph 800 of FIG. 8A. In this example, the Wi-Fi technology is 5 G and the bandwidths are HE 20 and HE 80. The graph 800 shows two thresholds, a link 2 threshold between 70 and 80 (for C2) and a link 1 threshold between 40 and 50. Between these thresholds (hysteresis), the STA may not switch operations between MLSR and MLMR. Outside of these thresholds, the STA may switch operations.

Figure 9:
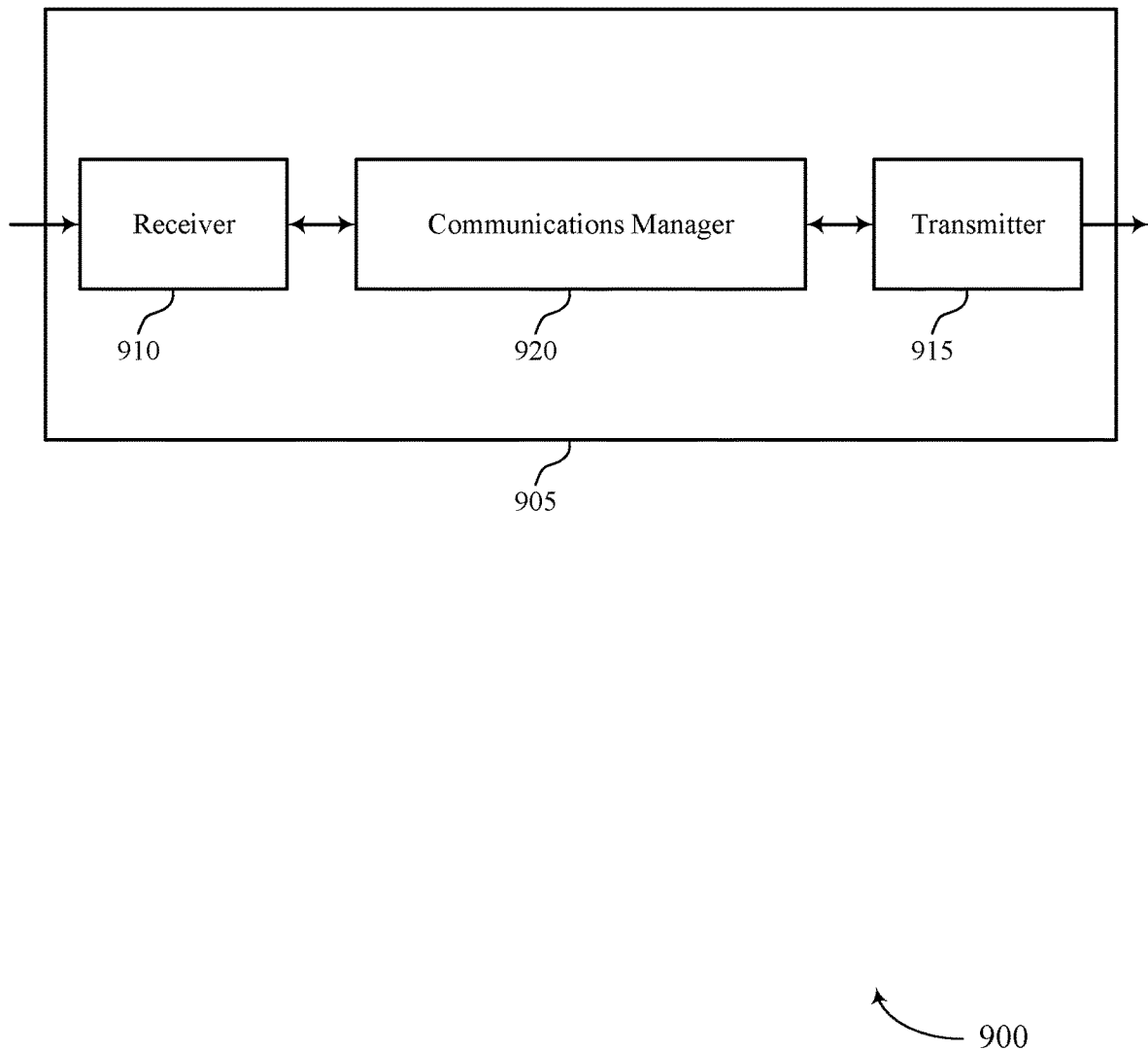
FIG. 9 shows a block diagrams of devices that support station performance enhancement with multi-link operations in accordance with aspects of the present disclosure.

FIG. 9 shows a block diagram 900 of a device 905 that supports station performance enhancement with multi-link operations in accordance with aspects of the present disclosure. The device 905 may be an example of aspects of a STA as described herein. The device 905 may include a receiver 910, a transmitter 915, and a communications manager 920. The device 905 may also include a processor. Each of these components may be in communication with one another (e.g., via one or more buses). The communications manager 920 may be an example of the communications manager 130 of FIG. 1.

The receiver 910 may provide a means for receiving information such as packets, user data, control information, or any combination thereof associated with various information channels (e.g., control channels, data channels, information channels related to station performance enhancement with multi-link operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to station performance enhancement with multi-link operations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of station performance enhancement with multi-link operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application specific integrated circuit (ASIC), a field programmable gate array (FPGA) or other programmable logic device (PLD), a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication in accordance with examples as disclosed herein. For example, the communications manager 920 may be configured as or otherwise support a means for determining at least one network metric related to at least one link between a STA and one or more APs. The communications manager 920 may be configured as or otherwise support a means for determining at least one connection parameter related to at least one application operating on the STA. The communications manager 920 may be configured as or otherwise support a means for selecting a mode of multi-link operations based on the at least one network metric and the at least one connection parameter, where the mode of multi-link operations includes one or more of: a dual-link mode in which the STA operates over the first link and the second link at a same time or a single-link mode in which the STA operates over one of the first link or the second link. The communications manager 920 may be configured as or otherwise support a means for communicating with the one or more APs according to the selected mode of multi-link operations.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for enhancing multi-link operations. The communications manager 920 may determine when MLSR would meet application requirements regarding throughput, latency, and reliability, in order to save power over MLMR operations, and to use MLMR when indicated for throughput, latency, reliability, or other factors.

Figure 10:
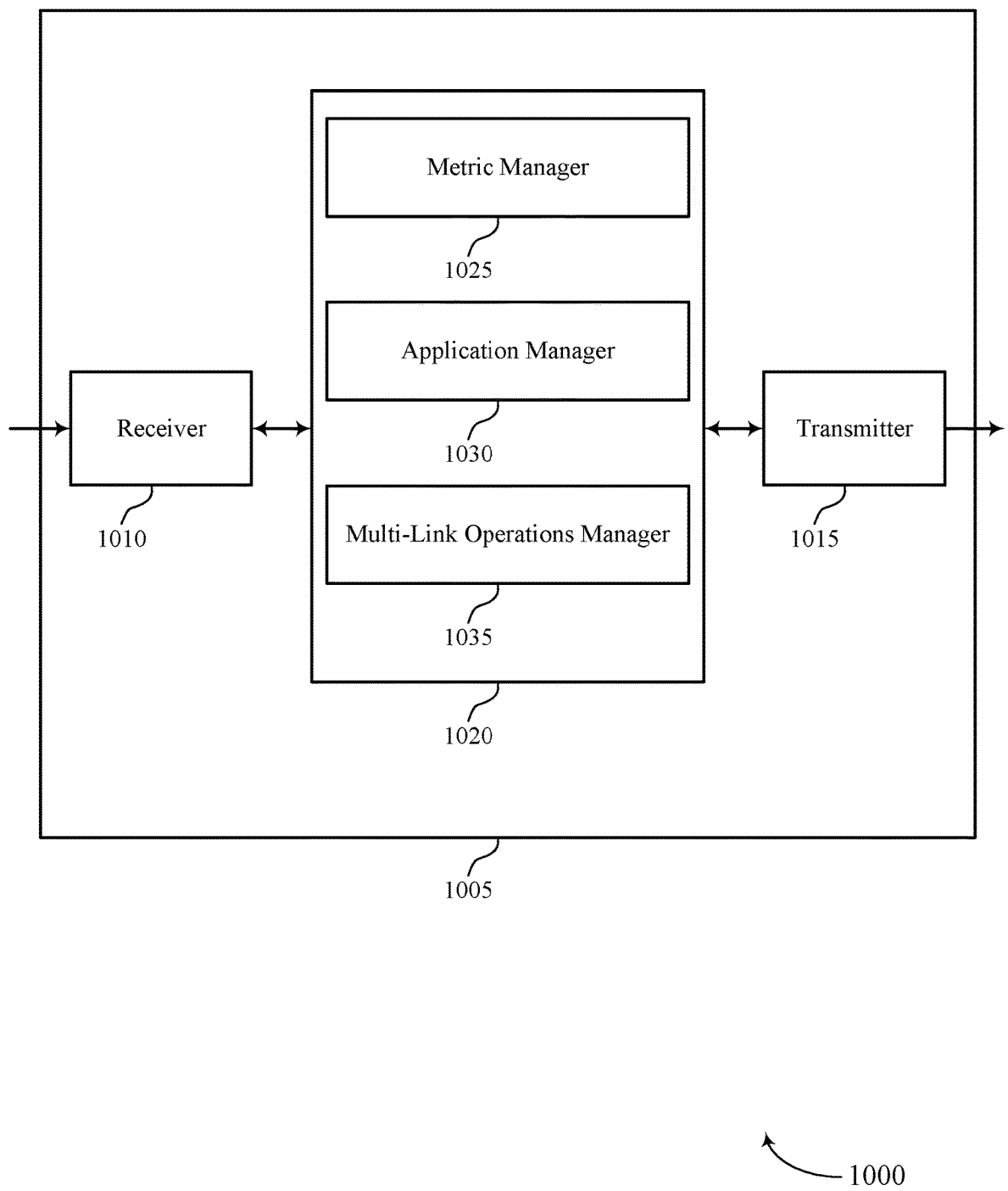
FIGS. 10 and 11 show block diagrams of example communications managers that supports station performance enhancement with multi-link operations in accordance with aspects of the present disclosure.

FIG. 10 shows a block diagram 1000 of a device 1005 that supports station performance enhancement with multi-link operations in accordance with aspects of the present disclosure. The device 1005 may be an example of aspects of a device 905 or a STA 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to station performance enhancement with multi-link operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to station performance enhancement with multi-link operations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of station performance enhancement with multi-link operations as described herein. For example, the communications manager 1020 may include a metric manager 1025, an application manager 1030, a multi-link operations manager 1035, a transceiver 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. The metric manager 1025 may be configured as or otherwise support a means for determining at least one network metric related to at least one link between a STA and one or more APs. The application manager 1030 may be configured as or otherwise support a means for determining at least one connection parameter related to at least one application operating on the STA. The multi-link operations manager 1035 may be configured as or otherwise support a means for selecting a mode of multi-link operations based on the at least one network metric and the at least one connection parameter, where the mode of multi-link operations includes one or more of: a dual-link mode in which the STA operates over the first link and the second link at a same time or a single-link mode in which the STA operates over one of the first link or the second link. The transceiver 1040 may be configured as or otherwise support a means for communicating with the one or more APs according to the selected mode of multi-link operations.

Figure 11:
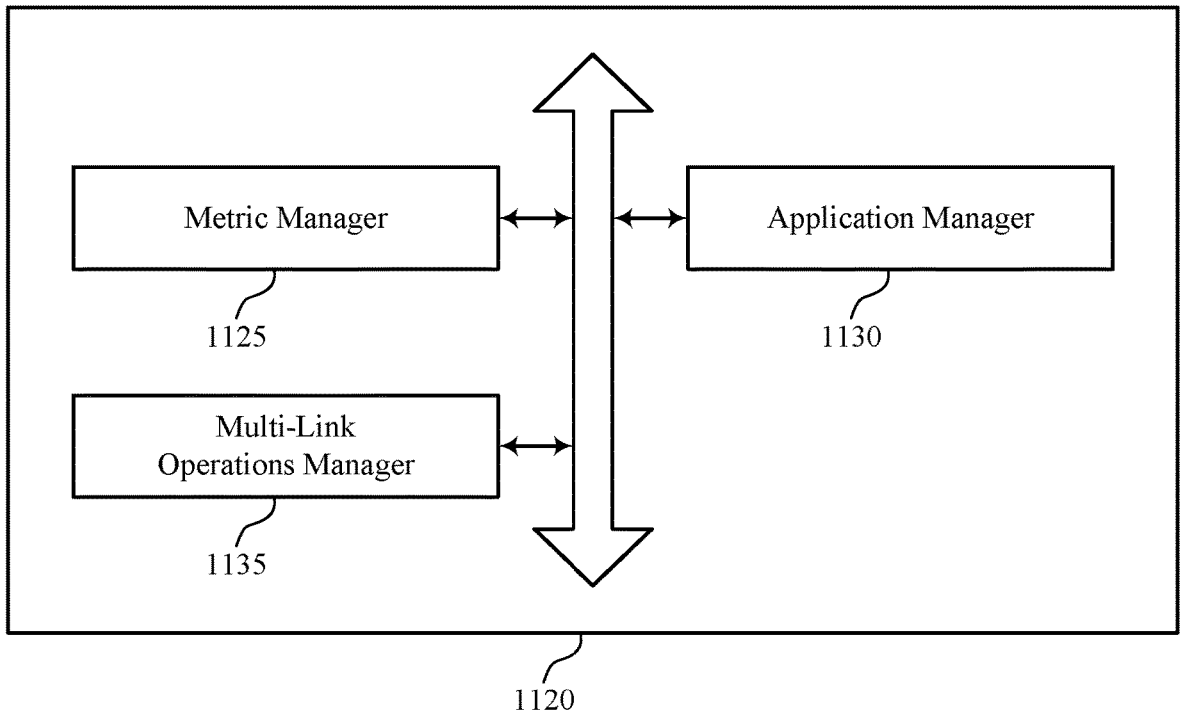

FIG. 11 shows a block diagram 1100 of a communications manager 1120 that supports station performance enhancement with multi-link operations in accordance with aspects of the present disclosure. The communications manager 1120 may be an example of aspects of a communications manager 920, a communications manager 1020, or both, as described herein. The communications manager 1120, or various components thereof, may be an example of means for performing various aspects of station performance enhancement with multi-link operations as described herein. For example, the communications manager 1120 may include a metric manager 1125, an application manager 1130, a multi-link operations manager 1135, or any combination thereof. Each of these components may communicate, directly or indirectly, with one another (e.g., via one or more buses).

The communications manager 1120 may support wireless communication in accordance with examples as disclosed herein. The metric manager 1125 may be configured as or otherwise support a means for determining at least one network metric related to at least one link between a STA and one or more APs. The application manager 1130 may be configured as or otherwise support a means for determining at least one connection parameter related to at least one application operating on the STA. The multi-link operations manager 1135 may be configured as or otherwise support a means for selecting a mode of multi-link operations based on the at least one network metric and the at least one connection parameter, where the mode of multi-link operations includes one or more of: a dual-link mode in which the STA operates over the first link and the second link at a same time or a single-link mode in which the STA operates over one of the first link or the second link. The communications manager 1120 may be configured as or otherwise support a means for communicating with the one or more APs according to the selected mode of multi-link operations.

In some examples, the at least one network metric related to the at least one link includes a first congestion metric of the first link and a second congestion metric of the second link, and the metric manager 1125 may be configured as or otherwise support a means for determining a composite metric based on the first congestion metric and the second congestion metric, where selecting the mode of the dual-link operations further includes selecting the mode of the dual-link operations based on the composite metric. In some examples, the at least one network metric related to the at least one link includes a first congestion metric of the first link and a second congestion metric of the second link, and the multi-link operations manager 1135 may be configured as or otherwise support a means for selecting the single-link mode of the dual-link operations when the composite metric is less than a composite threshold level. In some examples, the at least one network metric related to the at least one link includes a first congestion metric of the first link and a second congestion metric of the second link, and the multi-link operations manager 1135 may be configured as or otherwise support a means for selecting the dual-link mode of the dual-link operations when the composite metric is at or exceeds the composite threshold level.

In some examples, to support selecting the mode of the dual-link operations, the multi-link operations manager 1135 may be configured as or otherwise support a means for selecting the single-link mode of the dual-link operations when the throughput level of the first link is at or exceeds the throughput threshold level of the first application. In some examples, to support selecting the mode of the dual-link operations, the multi-link operations manager 1135 may be configured as or otherwise support a means for selecting the dual-link mode of the dual-link operations when the throughput level of the first link is less than the throughput threshold level of the first application.

In some examples, to support selecting the mode of the dual-link operations, the multi-link operations manager 1135 may be configured as or otherwise support a means for selecting the single-link mode of the dual-link operations over the first link when the first throughput level is at or exceeds the throughput threshold level. In some examples, to support selecting the mode of the dual-link operations, the multi-link operations manager 1135 may be configured as or otherwise support a means for selecting the single-link mode of the dual-link operations over the second link when the first throughput level is less than the throughput threshold level of the first application and the second throughput level exceeds the throughput threshold level. In some examples, to support selecting the mode of the dual-link operations, the multi-link operations manager 1135 may be configured as or otherwise support a means for selecting the dual-link mode of the dual-link operations when the first throughput level and the second throughput level are less than the throughput threshold level.

In some examples, to support selecting the mode of the dual-link operations, the multi-link operations manager 1135 may be configured as or otherwise support a means for selecting the single-link mode of the dual-link operations over the first link when the first latency level is at or below the latency threshold level. In some examples, to support selecting the mode of the dual-link operations, the multi-link operations manager 1135 may be configured as or otherwise support a means for selecting the single-link mode of the dual-link operations over the second link when the first latency level exceeds the latency threshold level and a second latency level is at or below the latency threshold level. In some examples, to support selecting the mode of the dual-link operations, the multi-link operations manager 1135 may be configured as or otherwise support a means for selecting the dual-link mode of the dual-link operations when the first latency level and the second latency level exceeds the latency threshold level.

In some examples, the at least one network metric related to the at least one link includes a combined network metric related to at least the first link and the second link. In some examples, identifying which mode of the dual-link operations the STA is to operate in based on the combined network metric. In some examples, the at least one network metric related to the at least one link includes a congestion level of the first link or a latency level of the first link. In some examples, the network condition includes at least one of a latency requirement, a number of beacon misses being above a beacon miss threshold, or a signal strength value being below a signal strength threshold.

In some examples, to support selecting the mode of the dual-link operations, the metric manager 1125 may be configured as or otherwise support a means for detecting a network condition based on the at least one connection parameter. In some examples, to support selecting the mode of the dual-link operations, the multi-link operations manager 1135 may be configured as or otherwise support a means for switching an operating mode of the dual-link mode based on a presence of the network condition.

In some examples, the metric manager 1125 may be configured as or otherwise support a means for determining that the network condition persists for a time duration, where switching the operating mode is further based on the network condition persisting for the time duration.

In some examples, to support switching the operating mode, the multi-link operations manager 1135 may be configured as or otherwise support a means for switching the operating mode from the dual-link mode to the single-link mode when the first link has the network condition and the second link does not have the network condition.

In some examples, to support selecting the mode of the dual-link operations, the multi-link operations manager 1135 may be configured as or otherwise support a means for selecting the single-link mode of the dual-link operations over the first link, where the at least one network metric related to the at least one link is a first network metric of the first link. In some examples, to support selecting the mode of the dual-link operations, the metric manager 1125 may be configured as or otherwise support a means for determining that the first network metric is at or exceeds a threshold level. In some examples, to support selecting the mode of the dual-link operations, the multi-link operations manager 1135 may be configured as or otherwise support a means for determining a second network metric of the second link of the dual-link operations based on determining that the first network metric is at or exceeds the threshold level. In some examples, to support selecting the mode of the dual-link operations, the metric manager 1125 may be configured as or otherwise support a means for determining whether to switch to operating in the single-link mode of the dual-link operations over the second link based on the second network metric of the second link.

In some examples, the multi-link operations manager 1135 may be configured as or otherwise support a means for operating in the single-link mode of the dual-link operations over the first link based on the selecting. In some examples, the metric manager 1125 may be configured as or otherwise support a means for determining a reliability level related to the second link. In some examples, the multi-link operations manager 1135 may be configured as or otherwise support a means for selecting the single-link mode of the dual-link operations over the second link or the dual-link mode of the dual-link operations based on the reliability level related to the second link.

In some examples, the metric manager 1125 may be configured as or otherwise support a means for determining that a reliability level related to the first link is below a reliability threshold, where determining the reliability level related to the second link is based on the reliability level.

In some examples, to support determining the at least one network metric, the metric manager 1125 may be configured as or otherwise support a means for estimating a congestion level of the first link and the second link.

Figure 12:
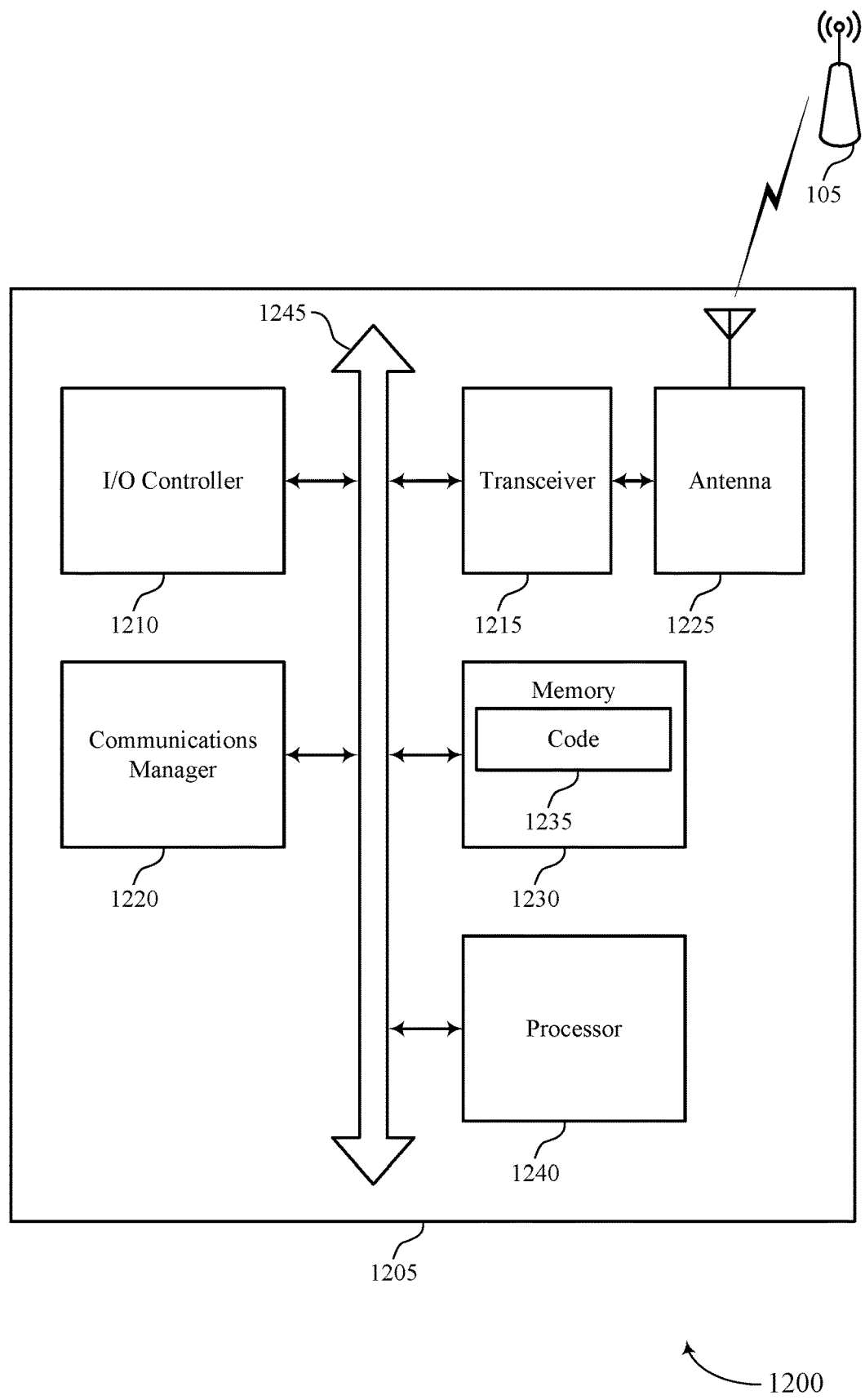
FIG. 12 shows a diagram of a system including a device that supports station performance enhancement with multi-link operations in accordance with aspects of the present disclosure.

FIG. 12 shows a diagram of a system 1200 including a device 1205 that supports station performance enhancement with multi-link operations in accordance with aspects of the present disclosure. The device 1205 may be an example of or include the components of a device 905, a device 1005, or a STA as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. In some other cases, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random-access memory (RAM) and read-only memory (ROM). The memory 1230 may store computer-readable, computer-executable code 1235 including instructions that, when executed by the processor 1240, cause the device 1205 to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting station performance enhancement with multi-link operations). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication in accordance with examples as disclosed herein. For example, the communications manager 1220 may be configured as or otherwise support a means for determining at least one network metric related to at least one link between a STA and one or more APs. The communications manager 1220 may be configured as or otherwise support a means for determining at least one connection parameter related to at least one application operating on the STA. The communications manager 1220 may be configured as or otherwise support a means for selecting a mode of multi-link operations based on the at least one network metric and the at least one connection parameter, where the mode of multi-link operations includes one or more of: a dual-link mode in which the STA operates over the first link and the second link at a same time or a single-link mode in which the STA operates over one of the first link or the second link. The communications manager 1220 may be configured as or otherwise support a means for communicating with the one or more APs according to the selected mode of multi-link operations.

By including or configuring the communications manager 1220 in accordance with examples as described herein, the device 1205 may support techniques for enhancing multi-link operations. The communications manager 1220 may determine when MLSR would meet application requirements regarding throughput, latency, and reliability, in order to save power over MLMR operations, and to use MLMR when indicated for throughput, latency, reliability, or other factors. These techniques may improve user experience related to wireless communications, reduce power consumption, and more efficiently utilize communication resources.

Figure 13:
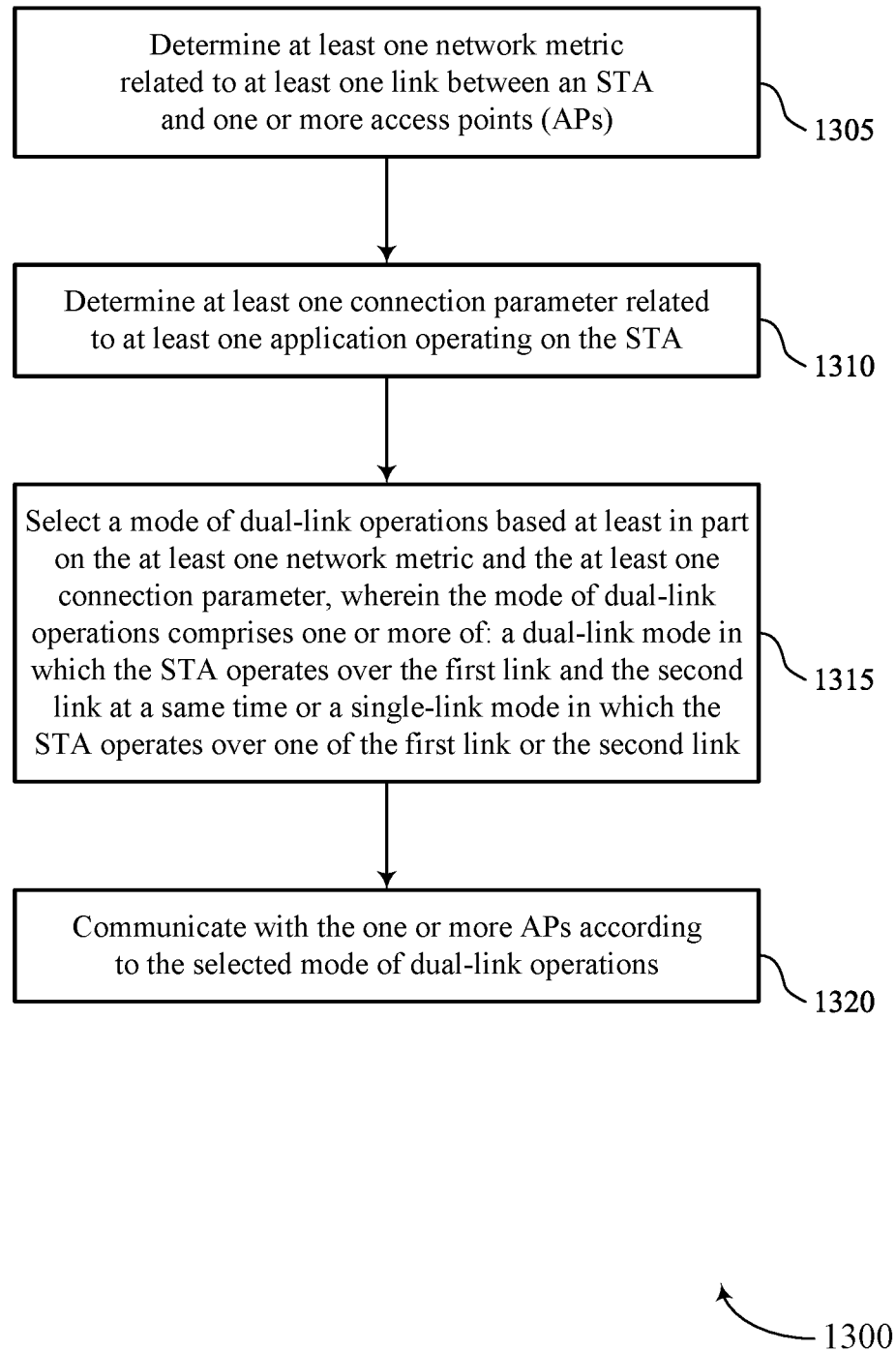
FIGS. 13 and 14 show flowcharts illustrating methods that support station performance enhancement with multi-link operations in accordance with aspects of the present disclosure.

FIG. 13 shows a flowchart illustrating a method 1300 that supports station performance enhancement with multi-link operations in accordance with aspects of the present disclosure. The operations of the method 1300 may be implemented by a STA or its components as described herein. For example, the operations of the method 1300 may be performed by a STA as described with reference to FIGS. 1 through 12. In some examples, a STA may execute a set of instructions to control the functional elements of the STA to perform the described functions. Additionally, or alternatively, the STA may perform aspects of the described functions using special-purpose hardware.

At 1305, the method may include determining at least one network metric related to at least one link between a STA and one or more APs. The operations of 1305 may be performed in accordance with examples as disclosed herein. In some examples, aspects of the operations of 1305 may be performed by a metric manager 1125 as described with reference to FIG. 11.

At 1310, the method may include determining at least one connection parameter related to at least one application operating on the STA. The operations of 1310 may be performed in accordance with examples as disclosed herein. In some examples, aspects of the operations of 1310 may be performed by an application manager 1130 as described with reference to FIG. 11.

At 1315, the method may include selecting a mode of multi-link operations based on the at least one network metric and the at least one connection parameter, where the mode of multi-link operations includes one or more of: a multi-link mode in which the STA operates over at least the first link and the second link at a same time or a single-link mode in which the STA operates over one of the first link or the second link. The operations of 1315 may be performed in accordance with examples as disclosed herein. In some examples, aspects of the operations of 1315 may be performed by a multi-link operations manager 1135 as described with reference to FIG. 11.

At 1320, the method may include communicating with the one or more APs according to the selected mode of multi-link operations. The operations of 1320 may be performed in accordance with examples as disclosed herein. In some examples, aspects of the operations of 1320 may be performed by a transceiver.

Figure 14:
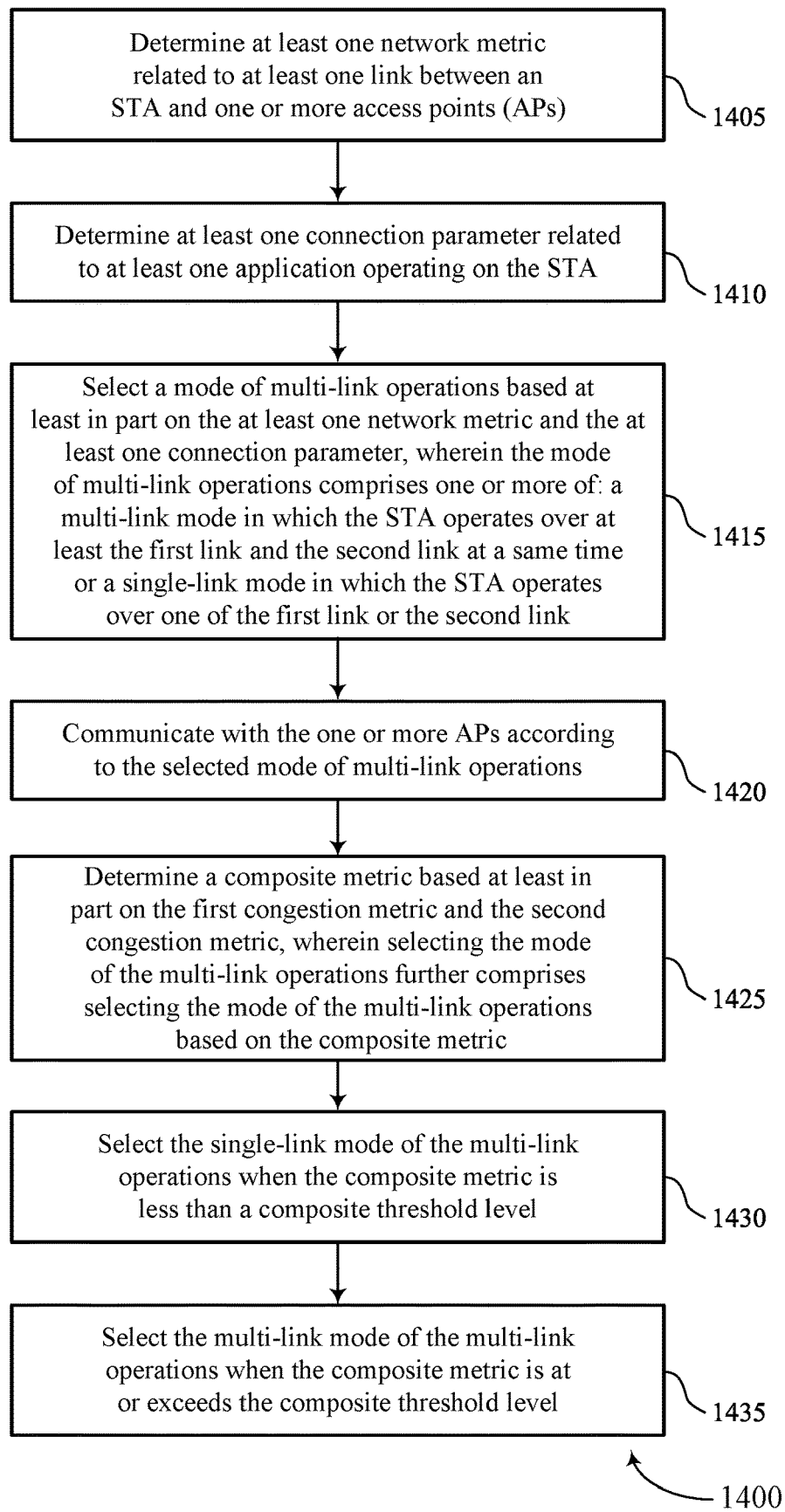

FIG. 14 shows a flowchart illustrating a method 1400 that supports station performance enhancement with multi-link operations in accordance with aspects of the present disclosure. The operations of the method 1400 may be implemented by a STA or its components as described herein. For example, the operations of the method 1400 may be performed by a STA as described with reference to FIGS. 1 through 12. In some examples, a STA may execute a set of instructions to control the functional elements of the STA to perform the described functions. Additionally, or alternatively, the STA may perform aspects of the described functions using special-purpose hardware.

At 1405, the method may include determining at least one network metric related to at least one link between a STA and one or more APs. The operations of 1405 may be performed in accordance with examples as disclosed herein. In some examples, aspects of the operations of 1405 may be performed by a metric manager 1125 as described with reference to FIG. 11.

At 1410, the method may include determining at least one connection parameter related to at least one application operating on the STA. The operations of 1410 may be performed in accordance with examples as disclosed herein. In some examples, aspects of the operations of 1410 may be performed by an application manager 1130 as described with reference to FIG. 11.

At 1415, the method may include selecting a mode of multi-link operations based on the at least one network metric and the at least one connection parameter, where the mode of multi-link operations includes one or more of a multi-link mode in which the STA operates over at least the first link and the second link at a same time or a single-link mode in which the STA operates over one of the first link or the second link. The operations of 1415 may be performed in accordance with examples as disclosed herein. In some examples, aspects of the operations of 1415 may be performed by a multi-link operations manager 1135 as described with reference to FIG. 11.

At 1420, the method may include communicating with the one or more APs according to the selected mode of multi-link operations. The operations of 1420 may be performed in accordance with examples as disclosed herein. In some examples, aspects of the operations of 1420 may be performed by a transceiver 1140 as described with reference to FIG. 11.

At 1425, the method may include determining a composite metric based on the first congestion metric and the second congestion metric, where selecting the mode of the multi-link operations further includes selecting the mode of the multi-link operations based on the composite metric. The operations of 1425 may be performed in accordance with examples as disclosed herein. In some examples, aspects of the operations of 1425 may be performed by a metric manager 1125 as described with reference to FIG. 11.

At 1430, the method may include selecting the single-link mode of the multi-link operations when the composite metric is less than a composite threshold level. The operations of 1430 may be performed in accordance with examples as disclosed herein. In some examples, aspects of the operations of 1430 may be performed by a multi-link operations manager 1135 as described with reference to FIG. 11.

At 1435, the method may include selecting the multi-link mode of the multi-link operations when the composite metric is at or exceeds the composite threshold level. The operations of 1435 may be performed in accordance with examples as disclosed herein. In some examples, aspects of the operations of 1435 may be performed by a multi-link operations manager 1135 as described with reference to FIG. 11.

It should be noted that the methods described herein describe possible implementations, and that the operations and the steps may be rearranged or otherwise modified and that other implementations are possible. Furthermore, aspects from two or more of the methods may be combined.

Aspect 1: A method for wireless communication, comprising: determining at least one network metric related to at least one link between an STA and one or more access points (APs); determining at least one connection parameter related to at least one application operating on the STA; selecting a mode of multi-link operations based at least in part on the at least one network metric and the at least one connection parameter, wherein the mode of multi-link operations comprises one or more of a multi-link mode in which the STA operates over at least a first link and a second link at a same time or a single-link mode in which the STA operates over one of the first link or the second link; and communicating with the one or more APs according to the selected mode of multi-link operations.

Aspect 2: The method of aspect 1, wherein the at least one network metric related to the at least one link comprises a first congestion metric of the first link and a second congestion metric of the second link, the method further comprising: determining a composite metric based at least in part on the first congestion metric and the second congestion metric, wherein selecting the mode of the multi-link operations further comprises: selecting the single-link mode of the multi-link operations when the composite metric is less than a composite threshold level; and selecting the multi-link mode of the multi-link operations when the composite metric is at or exceeds the composite threshold level.

Aspect 3: The method of aspect 1, wherein the at least one network metric related to the at least one link comprises a throughput level of the first link, and wherein the at least one connection parameter related to the at least one application comprises a throughput threshold level of a first application, wherein selecting the mode of the multi-link operations further comprises: selecting the single-link mode of the multi-link operations when the throughput level of the first link is at or exceeds the throughput threshold level of the first application; and selecting the multi-link mode of the multi-link operations when the throughput level of the first link is less than the throughput threshold level of the first application.

Aspect 4: The method of aspect 1, wherein the at least one network metric related to the at least one link comprises a first throughput level of the first link and a second throughput level of the second link, and wherein the at least one connection parameter related to the at least one application comprises a throughput threshold level of a first application, wherein selecting the mode of the multi-link operations further comprises: selecting the single-link mode of the multi-link operations over the first link when the first throughput level is at or exceeds the throughput threshold level; selecting the single-link mode of the multi-link operations over the second link when the first throughput level is less than the throughput threshold level of the first application and the second throughput level exceeds the throughput threshold level; and selecting the multi-link mode of the multi-link operations when the first throughput level and the second throughput level are less than the throughput threshold level.

Aspect 5: The method of aspect 1, wherein the at least one network metric related to the at least one link comprises a first latency level of the first link and a second latency level of the second link, and wherein the at least one connection parameter related to the at least one application comprises a latency threshold level of a first application, wherein selecting the mode of the multi-link operations further comprises: selecting the single-link mode of the multi-link operations over the first link when the first latency level is at or below the latency threshold level; selecting the single-link mode of the multi-link operations over the second link when the first latency level exceeds the latency threshold level and the second latency level is at or below the latency threshold level; and selecting the multi-link mode of the multi-link operations when the first latency level and the second latency level exceeds the latency threshold level.

Aspect 6: The method of any of aspects 1 through 5, wherein the at least one network metric related to the at least one link comprises a combined network metric related to at least the first link and the second link, identifying which mode of the multi-link operations the STA is to operate in based at least in part on the combined network metric Aspect 7: The method of any of aspects 1 through 6, wherein selecting the mode of the multi-link operations further comprises: detecting a network condition based at least in part on the at least one connection parameter; and switching an operating mode of the multi-link mode based at least in part on a presence of the network condition.

Aspect 8: The method of aspect 7, wherein switching the operating mode further comprises: switching the operating mode from the multi-link mode to the single-link mode when the first link has the network condition and the second link does not have the network condition.

Aspect 9: The method of any of aspects 7 through 8, further comprising: determining that the network condition persists for a time duration, wherein switching the operating mode is further based at least in part on the network condition persisting for the time duration.

Aspect 10: The method of any of aspects 7 through 9, wherein the network condition comprises at least one of a latency requirement, a number of beacon misses being above a beacon miss threshold, or a signal strength value being below a signal strength threshold.

Aspect 11: The method of any of aspects 1 or 7 through 9, wherein selecting the mode of the multi-link operations further comprises: selecting the single-link mode of the multi-link operations over the first link, wherein the at least one network metric related to the at least one link is a first network metric of the first link; determining that the first network metric is at or exceeds a threshold level; determining a second network metric of the second link of the multi-link operations based at least in part on determining that the first network metric is at or exceeds the threshold level; and determining whether to switch to operating in the single-link mode of the multi-link operations over the second link based at least in part on the second network metric of the second link.

Aspect 12: The method of any of aspects 1 through 11, further comprising: operating in the single-link mode of the multi-link operations over the first link based at least in part on the selecting; determining a reliability level related to the second link; and selecting the single-link mode of the multi-link operations over the second link or the multi-link mode of the multi-link operations based at least in part on the reliability level related to the second link.

Aspect 13: The method of aspect 12, further comprising: determining that a reliability level related to the first link is below a reliability threshold, wherein determining the reliability level related to the second link is based at least in part on the reliability threshold.

Aspect 14: The method of aspect 1, wherein the at least one network metric related to the at least one link comprises a congestion level of the first link or a latency level of the first link.

Aspect 15: The method of aspect 1, wherein determining the at least one network metric further comprises: estimating a congestion level of at least the first link and the second link.

Aspect 16: An apparatus for wireless communication, comprising a processor; memory coupled with the processor; and instructions stored in the memory and executable by the processor to cause the apparatus to perform a method of any of aspects 1 through 15.

Aspect 17: An apparatus for wireless communication, comprising at least one means for performing a method of any of aspects 1 through 15.

Aspect 18: A non-transitory computer-readable medium storing code for wireless communication, the code comprising instructions executable by a processor to perform a method of any of aspects 1 through 15.

Techniques described herein may be used for various wireless communications systems such as CDMA, time division multiple access (TDMA), FDMA, orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the WLAN 100 of FIG. 1 and the wireless communications system 200 of FIG. 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining at least one network metric related to at least one link between a station (STA) and one or more access points (APs);
   determining at least one connection parameter related to at least one application operating on the STA;
   selecting one of several modes of multi-link operations based at least in part on the at least one network metric and the at least one connection parameter, wherein:
      the modes of multi-link operations comprise a multi-link mode in which the STA operates via at least a first link and a second link at a same time and based on a same wireless technology and a single-link mode in which the STA operates via one of the first link or the second link; and
      the at least one network metric related to the at least one link comprises a first congestion metric of the first link and a second congestion metric of the second link;
   determining a composite metric based at least in part on the first congestion metric and the second congestion metric, wherein selecting the mode comprises:
      selecting the single-link mode when the composite metric is less than a composite threshold level; and
      selecting the multi-link mode when the composite metric is at or exceeds the composite threshold level; and
   communicating with the one or more APs according to the selected mode of multi-link operations.

2. The method of claim 1, wherein the at least one network metric related to the at least one link comprises a throughput level of the first link, and wherein the at least one connection parameter related to the at least one application comprises a throughput threshold level of a first application, wherein selecting the mode of the multi-link operations further comprises:
   selecting the single-link mode of the multi-link operations when the throughput level of the first link is at or exceeds the throughput threshold level of the first application; and
   selecting the multi-link mode of the multi-link operations when the throughput level of the first link is less than the throughput threshold level of the first application.

3. The method of claim 1, wherein the at least one network metric related to the at least one link comprises a first throughput level of the first link and a second throughput level of the second link, and wherein the at least one connection parameter related to the at least one application comprises a throughput threshold level of a first application, wherein selecting the mode of the multi-link operations further comprises:
   selecting the single-link mode of the multi-link operations via the first link when the first throughput level is at or exceeds the throughput threshold level;
   selecting the single-link mode of the multi-link operations via the second link when the first throughput level is less than the throughput threshold level of the first application and the second throughput level exceeds the throughput threshold level; and
   selecting the multi-link mode of the multi-link operations when the first throughput level and the second throughput level are less than the throughput threshold level.

4. The method of claim 1, wherein the at least one network metric related to the at least one link comprises a first latency level of the first link and a second latency level of the second link, and wherein the at least one connection parameter related to the at least one application comprises a latency threshold level of a first application, wherein selecting the mode of the multi-link operations further comprises:
   selecting the single-link mode of the multi-link operations via the first link when the first latency level is at or below the latency threshold level;
   selecting the single-link mode of the multi-link operations via the second link when the first latency level exceeds the latency threshold level and the second latency level is at or below the latency threshold level; and
   selecting the multi-link mode of the multi-link operations when the first latency level and the second latency level exceeds the latency threshold level.

5. The method of claim 1, wherein:
   the at least one network metric related to the at least one link comprises a combined network metric related to at least the first link and the second link.

6. The method of claim 1, wherein selecting the mode of the multi-link operations further comprises:
   detecting a network condition based at least in part on the at least one connection parameter; and
   switching an operating mode of the multi-link operations based at least in part on a presence of the network condition.

7. The method of claim 6, wherein switching the operating mode comprises:
   switching the operating mode from the multi-link mode to the single-link mode when the first link has the network condition and the second link does not have the network condition.

8. The method of claim 6, further comprising:
   determining that the network condition persists for a time duration, wherein switching the operating mode is further based at least in part on the network condition persisting for the time duration.

9. The method of claim 6, wherein the network condition comprises at least one of a latency requirement, a number of beacon misses being above a beacon miss threshold, or a signal strength value being below a signal strength threshold.

10. The method of claim 1, wherein selecting the mode of the multi-link operations further comprises:
    selecting the single-link mode of the multi-link operations via the first link, wherein the at least one network metric related to the at least one link is a first network metric of the first link;
    determining that the first network metric is at or exceeds a threshold level;
    determining a second network metric of the second link of the multi-link operations based at least in part on determining that the first network metric is at or exceeds the threshold level; and
    determining whether to switch to operating in the single-link mode of the multi-link operations via the second link based at least in part on the second network metric of the second link.

11. The method of claim 1, further comprising:
    operating in the single-link mode of the multi-link operations via the first link based at least in part on the selecting;

determining a reliability level related to the second link; and selecting the single-link mode of the multi-link operations via the second link or the multi-link mode of the multi-link operations based at least in part on the reliability level related to the second link.

12. The method of claim 11, further comprising:
determining that a reliability level related to the first link is below a reliability threshold, wherein determining the reliability level related to the second link is based at least in part on the reliability threshold.

13. The method of claim 1, wherein the at least one network metric related to the at least one link comprises a congestion level of the first link or a latency level of the first link.

14. The method of claim 1, wherein determining the at least one network metric further comprises:
estimating a congestion level of at least the first link and the second link.

15. The method of claim 1, wherein selecting the mode of multi-link operations further comprises:
selecting whether to operate in the multi-link mode or the single-link mode based at least in part on detecting an external trigger.

16. The method of claim 15, wherein selecting whether to operate in the multi-link mode or the single-link mode based on detecting the external trigger comprises:
selecting to operate in the multi-link mode based on detecting at least one of: roaming from a non-multi-link operation AP to a multi-link operation AP, use of a high throughput application, use of a low latency application, an indication of a low or ultra-low latency mode, an increase in a transmission control protocol window size, an increase in backhaul network capacity, or battery power exceeding a threshold; and
selecting to operate in the single-link mode based on detecting at least one of: roaming from a multi-link operation AP to an non-multi-link operation AP, use of a low throughput application, use of a high latency application, a decrease in a transmission control protocol window size, a decrease of backhaul network capacity, or battery power below the threshold.

17. An apparatus for wireless communication, comprising:
at least one processor;
memory coupled with the at least one processor; and
instructions stored in the memory and executable by the at least one processor to cause the apparatus to:
determine at least one network metric related to at least one link between a station (STA) and one or more access points (APs);
determine at least one connection parameter related to at least one application operating on the STA;
select one of several modes of multi-link operations based at least in part on the at least one network metric and the at least one connection parameter, wherein:
the modes of multi-link operations comprise a multi-link mode in which the STA operates via a first link and a second link at a same time and based on a same wireless technology and a single-link mode in which the STA operates via one of the first link or the second link; and
the at least one network metric related to the at least one link comprises a first congestion metric of the first link and a second congestion metric of the second link;

determining a composite metric based at least in part on the first congestion metric and the second congestion metric, wherein selecting the mode comprises:
selecting the single-link mode when the composite metric is less than a composite threshold level; and
selecting the multi-link mode when the composite metric is at or exceeds the composite threshold level; and
communicate with the one or more APs according to the selected mode of multi-link operations.

18. The apparatus of claim 17, wherein the instructions to select the mode of the multi-link operations are further executable by the at least one processor to cause the apparatus to:
select the single-link mode of the multi-link operations when a throughput level of the first link is at or exceeds a throughput threshold level of a first application; and
select the multi-link mode of the multi-link operations when the throughput level of the first link is less than the throughput threshold level of the first application.

19. The apparatus of claim 17, wherein the instructions to select the mode of the multi-link operations are further executable by the at least one processor to cause the apparatus to:
select the single-link mode of the multi-link operations via the first link when a first throughput level is at or exceeds the throughput threshold level;
select the single-link mode of the multi-link operations via the second link when the first throughput level is less than the throughput threshold level of a first application and a second throughput level exceeds the throughput threshold level; and
select the multi-link mode of the multi-link operations when the first throughput level and the second throughput level are less than the throughput threshold level.

20. The apparatus of claim 17, wherein the instructions to select the mode of the multi-link operations are further executable by the at least one processor to cause the apparatus to:
select the single-link mode of the multi-link operations via the first link when a first latency level is at or below a latency threshold level;
select the single-link mode of the multi-link operations via the second link when the first latency level exceeds the latency threshold level and a second latency level is at or below the latency threshold level; and
select the multi-link mode of the multi-link operations when the first latency level and the second latency level exceed the latency threshold level.

21. The apparatus of claim 17, wherein:
the at least one network metric related to the at least one link comprises a combined network metric related to at least the first link and the second link,
identifying which mode of the multi-link operations the STA is to operate in based at least in part on the combined network metric.

22. The apparatus of claim 17, wherein the instructions to select the mode of the multi-link operations are further executable by the at least one processor to cause the apparatus to:
detect a network condition based at least in part on the at least one connection parameter; and
switch an operating mode of the multi-link mode based at least in part on a presence of the network condition.

23. The apparatus of claim 22, wherein the instructions to switch the operating mode are executable by the at least one processor to cause the apparatus to:

switch the operating mode from the multi-link mode to the single-link mode when the first link has the network condition and the second link does not have the network condition.

24. The apparatus of claim 22, wherein the instructions are further executable by the at least one processor to cause the apparatus to:
determine that the network condition persists for a time duration, wherein switching the operating mode is further based at least in part on the network condition persisting for the time duration.

25. The apparatus of claim 22, wherein the network condition comprises at least one of a latency requirement, a number of beacon misses being above a beacon miss threshold, or a signal strength value being below a signal strength threshold.

26. The apparatus of claim 17, wherein the instructions to select the mode of the multi-link operations are further executable by the at least one processor to cause the apparatus to:
select the single-link mode of the multi-link operations via the first link, wherein the at least one network metric related to the at least one link is a first network metric of the first link;
determine that the first network metric is at or exceeds a threshold level;
determine a second network metric of the second link of the multi-link operations based at least in part on determining that the first network metric is at or exceeds the threshold level; and
determine whether to switch to operating in the single-link mode of the multi-link operations via the second link based at least in part on the second network metric of the second link.

27. The apparatus of claim 17, wherein the instructions are further executable by the at least one processor to cause the apparatus to:
operate in the single-link mode of the multi-link operations via the first link based at least in part on the selecting;
determine a reliability level related to the second link; and
select the single-link mode of the multi-link operations via the second link or the multi-link mode of the multi-link operations based at least in part on the reliability level related to the second link.

28. The apparatus of claim 27, wherein the instructions are further executable by the at least one processor to cause the apparatus to:
determine that a reliability level related to the first link is below a reliability threshold, wherein determining the reliability level related to the second link is based at least in part on the reliability threshold.

29. The apparatus of claim 17, wherein the at least one network metric related to the at least one link comprises a congestion level of the first link or a latency level of the first link.

30. The apparatus of claim 17, wherein the instructions to determine the at least one network metric are further executable by the at least one processor to cause the apparatus to:
estimate a congestion level of at least the first link and the second link.

31. A method for wireless communication, comprising:
determining at least one network metric related to at least one link between a station (STA) and one or more access points (APs), wherein the at least one network metric related to the at least one link comprises a first latency level of the first link and a second latency level of the second link;
determining at least one connection parameter related to at least one application operating on the STA, wherein the at least one connection parameter related to the at least one application comprises a latency threshold level of a first application;
selecting one of several modes of multi-link operations based at least in part on the at least one network metric and the at least one connection parameter, wherein:
the modes of multi-link operations comprise a multi-link mode in which the STA operates via at least a first link and a second link at a same time and based on a same wireless technology and a single-link mode in which the STA operates via one of the first link or the second link; and
selecting the mode of the multi-link operations comprises:
selecting the single-link mode of the multi-link operations over the first link when the first latency level is at or below the latency threshold level;
selecting the single-link mode of the multi-link operations over the second link when the first latency level exceeds the latency threshold level and the second latency level is at or below the latency threshold level; and
selecting the multi-link mode of the multi-link operations when the first latency level and the second latency level exceeds the latency threshold level; and
communicating with the one or more APs according to the selected mode of multi-link operations.

32. A method for wireless communication, comprising:
determining at least one network metric related to at least one link between a station (STA) and one or more access points (APs);
determining at least one connection parameter related to at least one application operating on the STA;
selecting one of several modes of multi-link operations based at least in part on the at least one network metric and the at least one connection parameter, wherein:
selecting the mode of the multi-link operations comprises detecting a network condition based at least in part on the at least one connection parameter and switching an operating mode of the multi-link operations based at least in part on a presence of the network condition, said switching comprising switching the operating mode from the multi-link mode to the single-link mode when the first link has the network condition and the second link does not have the network condition; and
the modes of multi-link operations comprise a multi-link mode in which the STA operates over at least a first link and a second link at a same time and based on a same wireless technology and a single-link mode in which the STA operates over one of the first link or the second link; and
communicating with the one or more APs according to the selected mode of multi-link operations.

33. The method of claim 32, further comprising:
determining that the network condition persists for a time duration, wherein switching the operating mode is further based at least in part on the network condition persisting for the time duration.

34. The method of claim 32, wherein the network condition comprises at least one of a latency requirement, a number of beacon misses being above a beacon miss threshold, or a signal strength value being below a signal strength threshold.

\* \* \* \* \*